US012641625B2

(12) United States Patent
Ko et al.

(10) Patent No.: US 12,641,625 B2
(45) Date of Patent: May 26, 2026

(54) METHOD AND DEVICE FOR CONFIGURING RESOURCE SELECTION WINDOW FOR SL GROUP TRANSMISSION IN NR V2X

(71) Applicant: LG Electronics Inc., Seoul (KR)

(72) Inventors: Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 18/280,440

(22) PCT Filed: Mar. 7, 2022

(86) PCT No.: PCT/KR2022/003156
§ 371 (c)(1),
(2) Date: Sep. 5, 2023

(87) PCT Pub. No.: WO2022/186667
PCT Pub. Date: Sep. 9, 2022

(65) Prior Publication Data
US 2024/0334453 A1       Oct. 3, 2024

(30) Foreign Application Priority Data
Mar. 5, 2021    (KR) ........................ 10-2021-0029361

(51) Int. Cl.
| | |
|---|---|
| *H04W 72/25* | (2023.01) |
| *H04L 1/1867* | (2023.01) |
| *H04W 72/542* | (2023.01) |

(52) U.S. Cl.
CPC ........... *H04W 72/25* (2023.01); *H04L 1/1896* (2013.01); *H04W 72/542* (2023.01)

(58) Field of Classification Search
CPC ... H04W 72/25; H04W 72/542; H04W 72/40; H04W 74/0808; H04W 4/40; H04W 4/44;
(Continued)

(56) References Cited

U.S. PATENT DOCUMENTS

| | | |
|---|---|---|
| 2020/0029245 A1 | 1/2020 | Khoryaev et al. |
| 2020/0229171 A1 | 7/2020 | Khoryaev et al. |

(Continued)

OTHER PUBLICATIONS

International Search Report and Written Opinion in Appln. No. PCT/KR2022/003156, mailed on Jun. 8, 2022, 8 pages (with English translation).

(Continued)

*Primary Examiner* — Mohamed A Kamara
(74) *Attorney, Agent, or Firm* — Fish & Richardson P.C.

(57) ABSTRACT

Proposed is a method for operation of a first device (100) in a wireless communication system. The method may comprise the steps of: selecting a set of candidate resources in a selection window; randomly selecting a first SL resource from among the set of candidate resources; after selecting the first SL resource, selecting at least one SL resource within a first time threshold value from the first SL resource; transmitting SCI to a second device (200) on the basis of the first SL resource and the at least one SL resource; and transmitting MAC PDU to the second device (200) on the basis of the first SL resource and the at least one SL resource.

15 Claims, 16 Drawing Sheets

(58) Field of Classification Search
CPC . H04W 92/18; H04W 72/1263; H04W 72/02;
H04W 72/0446; H04W 72/121; H04W
72/543; H04W 72/569; H04W 74/0816;
H04W 52/383; H04L 1/1896; H04L
1/1812; Y02D 30/70
See application file for complete search history.

(56) References Cited

U.S. PATENT DOCUMENTS

| | | | |
|---|---|---|---|
| 2020/0374861 A1 | 11/2020 | Shilov et al. | |
| 2021/0227604 A1* | 7/2021 | Huang | H04W 40/248 |
| 2022/0201528 A1* | 6/2022 | Shin | H04L 5/0053 |
| 2023/0083753 A1* | 3/2023 | Feng | H04W 4/44 |
| | | | 370/329 |
| 2023/0371005 A1* | 11/2023 | Cai | H04W 76/28 |

OTHER PUBLICATIONS

LG Electronics, "Discussion on resource allocation for power saving," 3GPP TSG RAN WG1 Meeting #104-e, R1-2100517, e-Meeting, Jan. 25-Feb. 5, 2021, 20 pages.

Moderator (Oppo), "FL summary for AI 8.11.1.1—resource allocation for power saving," 3GPP TSG RAN WG1 #104-e, R1-2101412, e-Meeting, Jan. 25-Feb. 5, 2021, 91 pages.

Oppo, "Power saving mechanisms in NR sidelink," 3GPP TSG RAN WG1 #104-e, R1-2100141, e-Meeting, Jan. 25-Feb. 5, 2021, 12 pages.

Samsung, "On resource allocation for power saving," 3GPP TSG RAN WG1 Meeting #104-e, R1-2101231, e-Meeting, Jan. 25-Feb. 5, 2021, 7 pages.

Extended European Search Report in European Appln No. 22763648. 7, mailed on Jan. 7, 2025, 9 pages.

* cited by examiner

FIG. 11
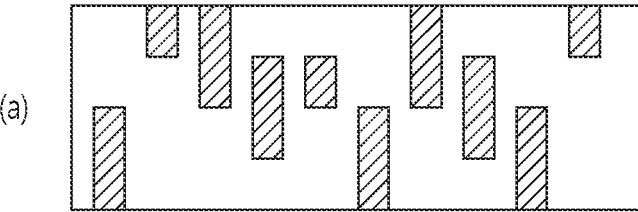
(a)
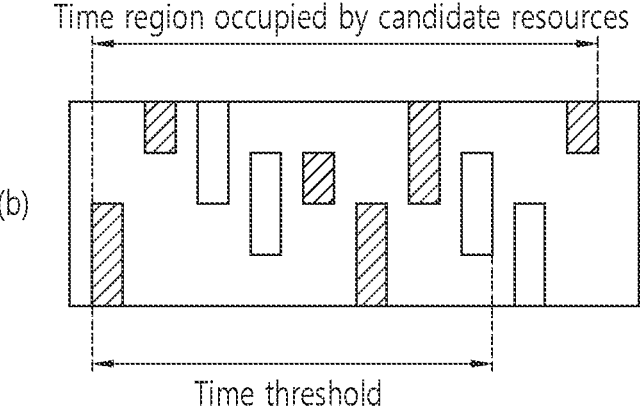
(b)
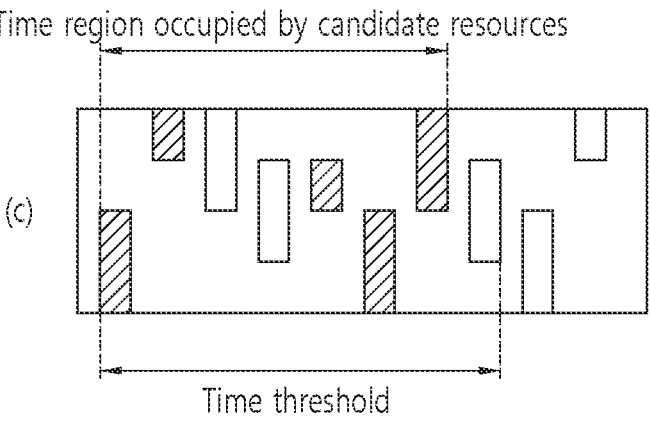
(c)

FIG. 13

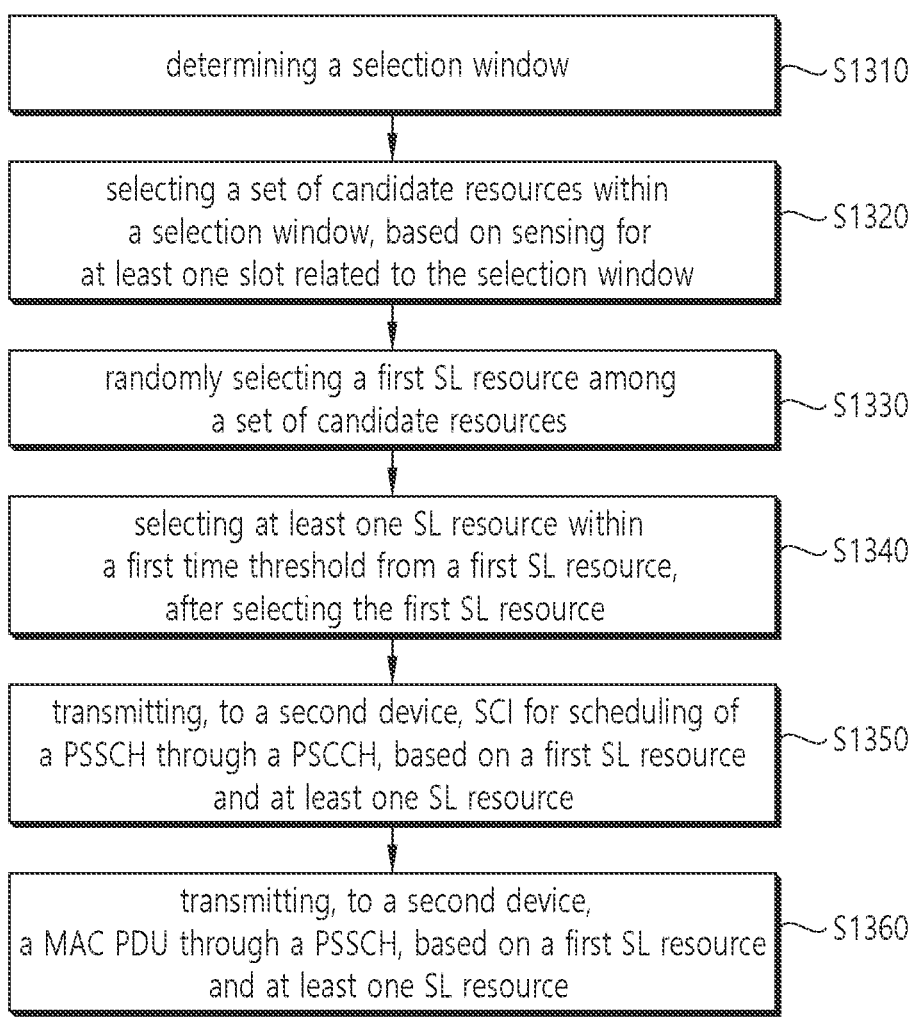

determining a selection window ~ S1310 selecting a set of candidate resources within a selection window, based on sensing for at least one slot related to the selection window ~ S1320 randomly selecting a first SL resource among a set of candidate resources ~ S1330 selecting at least one SL resource within a first time threshold from a first SL resource, after selecting the first SL resource ~ S1340 transmitting, to a second device, SCI for scheduling of a PSSCH through a PSCCH, based on a first SL resource and at least one SL resource ~ S1350 transmitting, to a second device, a MAC PDU through a PSSCH, based on a first SL resource and at least one SL resource ~ S1360

FIG. 14

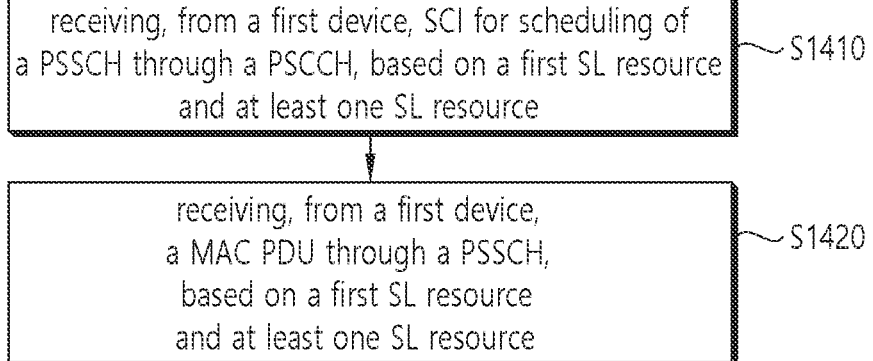

receiving, from a first device, SCI for scheduling of a PSSCH through a PSCCH, based on a first SL resource and at least one SL resource ~ S1410 receiving, from a first device, a MAC PDU through a PSSCH, based on a first SL resource and at least one SL resource ~ S1420

Device (100,200)

METHOD AND DEVICE FOR CONFIGURING RESOURCE SELECTION WINDOW FOR SL GROUP TRANSMISSION IN NR V2X

CROSS-REFERENCE TO RELATED APPLICATIONS

This application is a National Stage application under 35 U.S.C. § 371 of International Application No. PCT/KR2022/003156, filed on Mar. 7, 2022, which claims the benefit of Korean Patent Application No. 10-2021-0029361, filed on Mar. 5, 2021. The disclosures of the prior applications are incorporated herein by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

As an embodiment, an operation method of a first device 100 in wireless communication system is proposed. The method may comprise: selecting a set of candidate resources within a selection window; randomly selecting a first SL resource among the set of candidate resources; selecting at least one SL resource within a first time threshold from the first SL resource, after selecting the first SL resource; transmitting SCI, to a second device 200, based on the first SL resource and the at least one SL resource; and transmitting, to the second device 200, a MAC PDU, based on the first SL resource and the at least one SL resource.

The user equipment (UE) may efficiently perform SL communication.

BRIEF DESCRIPTION OF THE DRAWINGS

FIG. 2 shows a radio protocol architecture, based on an embodiment of the present disclosure.

FIG. 10 is a figure for explaining why burst resource reservation is necessary.

FIG. 11 shows a procedure for a UE to determine a set of candidate resources, according to one embodiment of the present disclosure.

FIG. 13 shows a procedure for a first device to perform wireless communication, according to one embodiment of the present disclosure.

FIG. 14 shows a procedure for a second device to perform wireless communication, according to one embodiment of the present disclosure.

DETAILED DESCRIPTION

Figure 1:
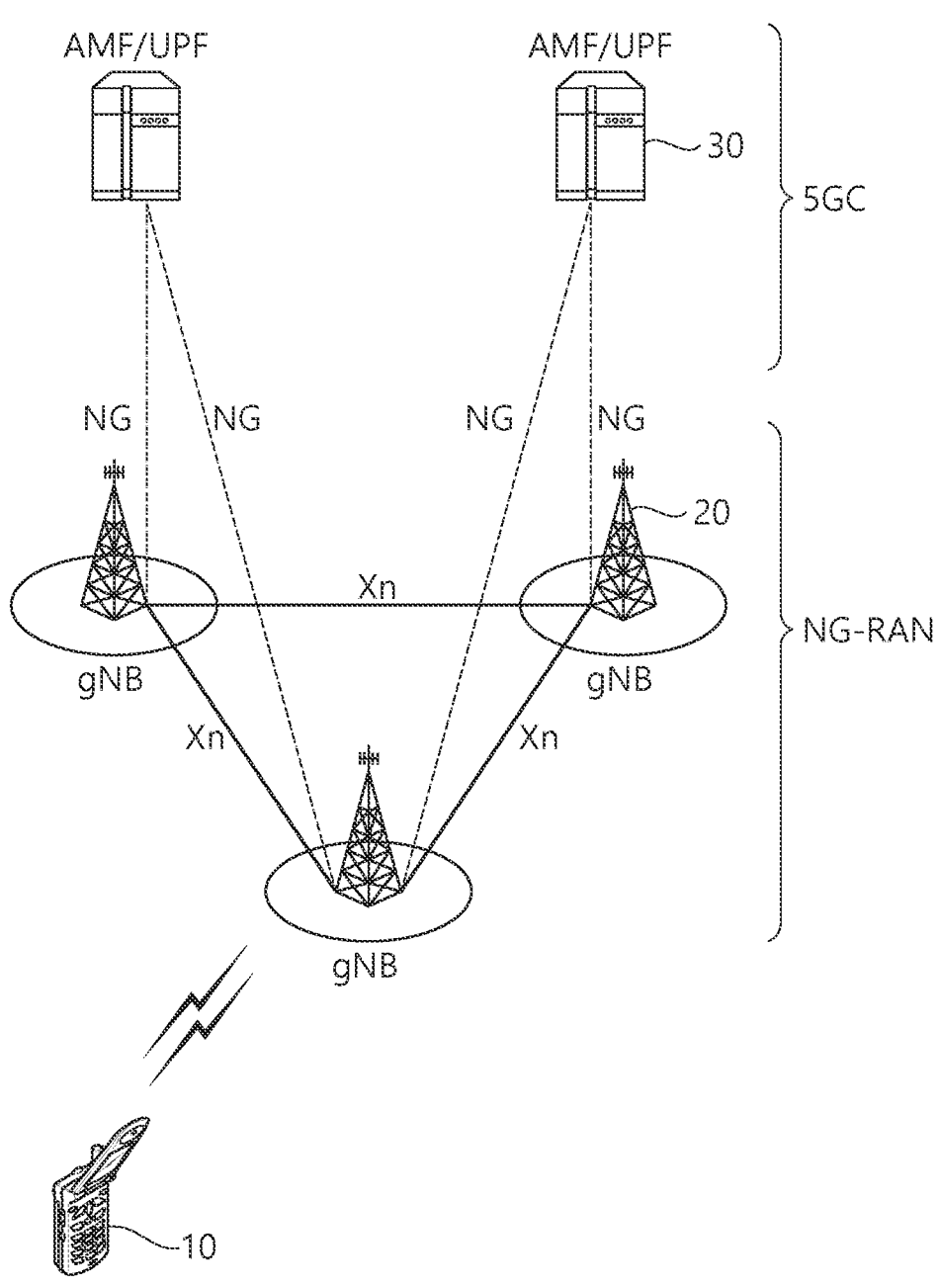
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
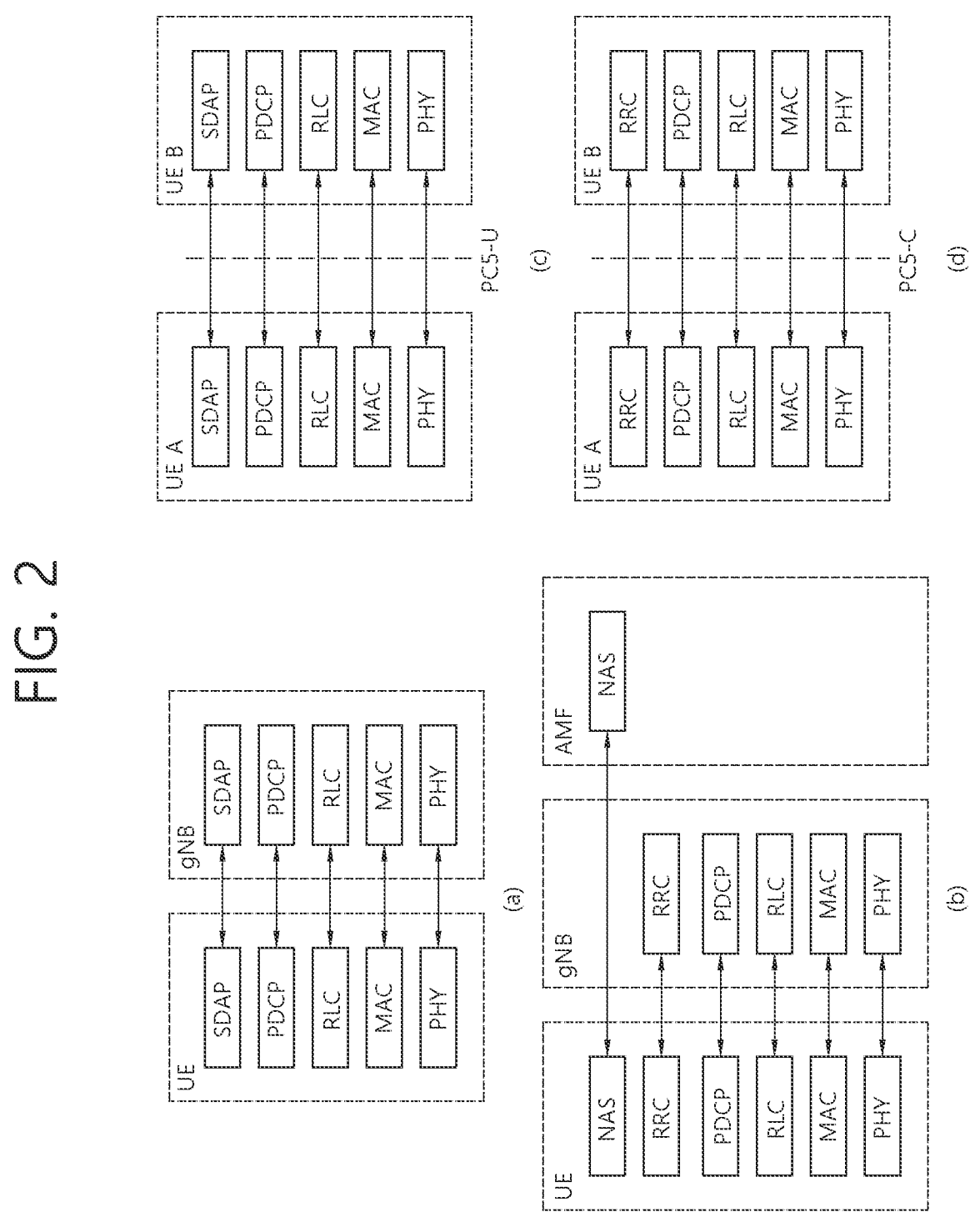

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
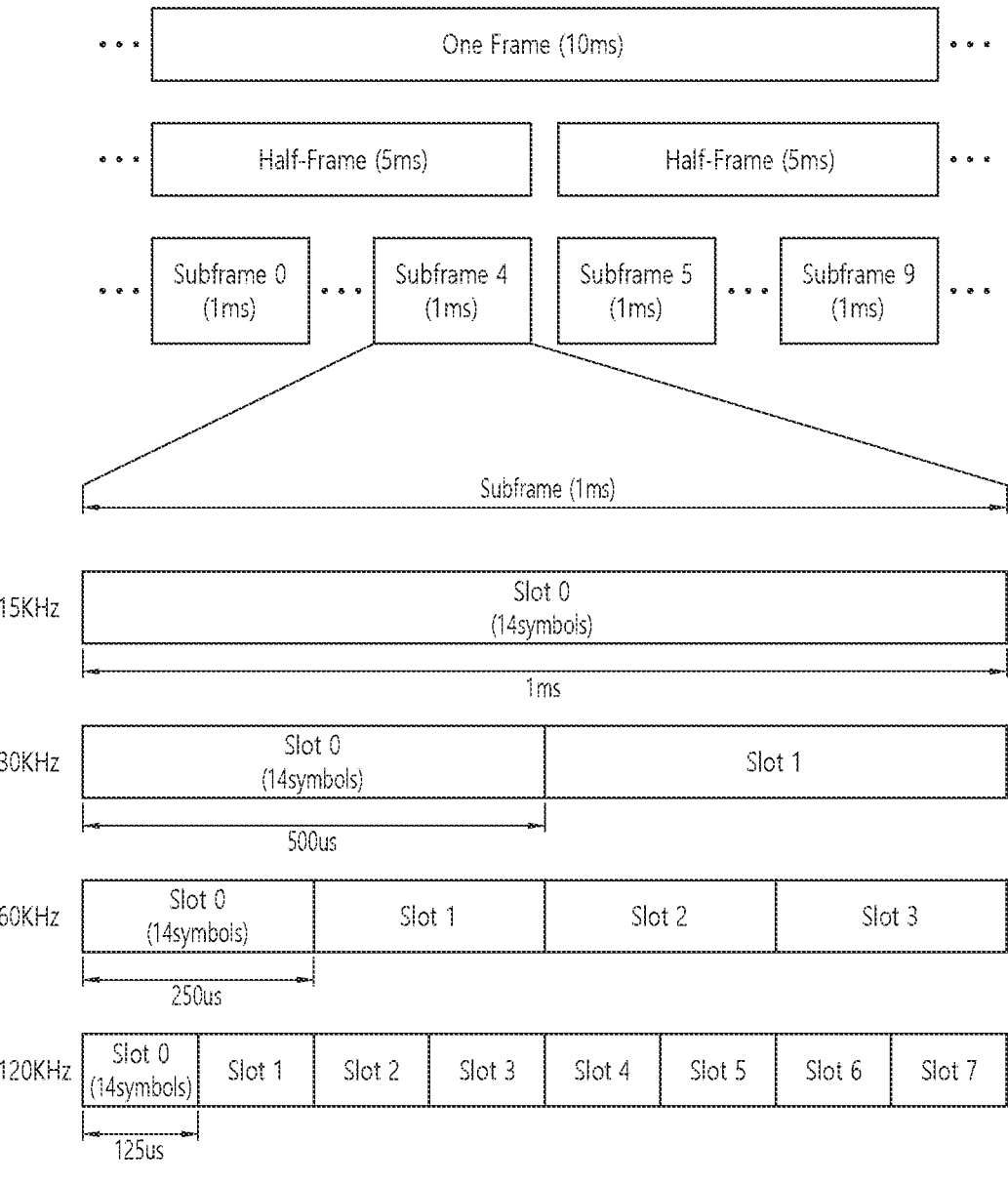
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
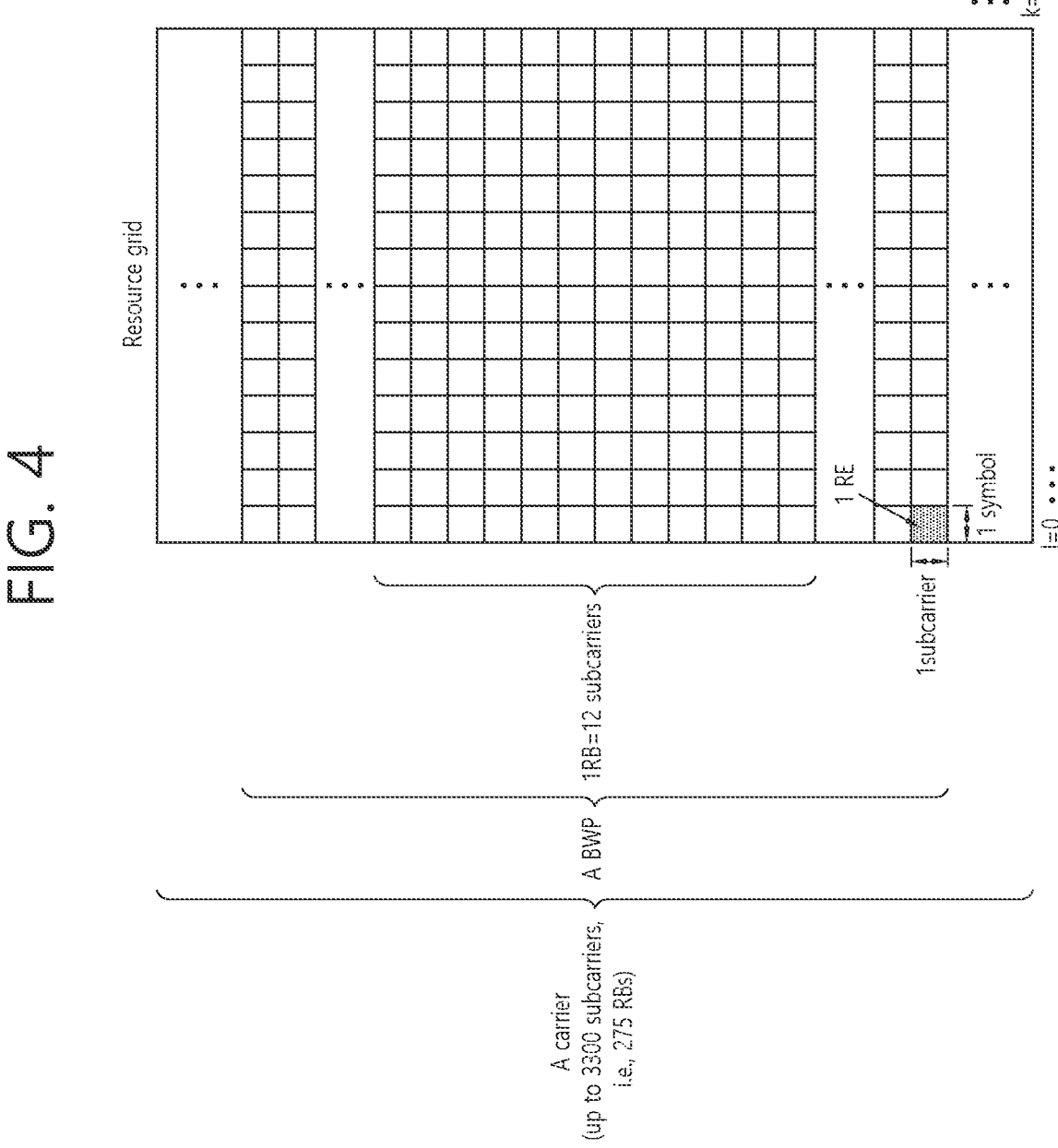
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 5:
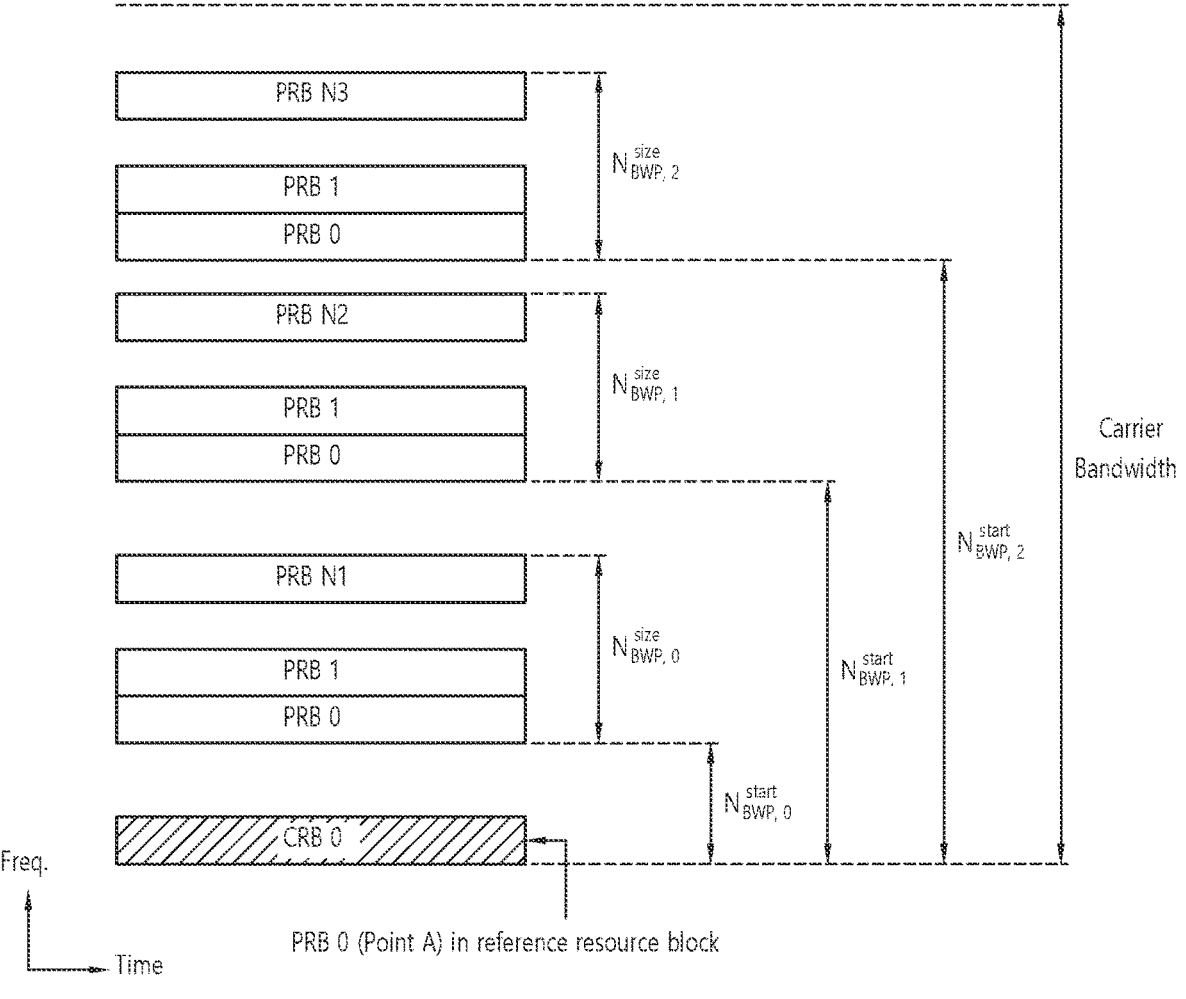
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$, from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 6:
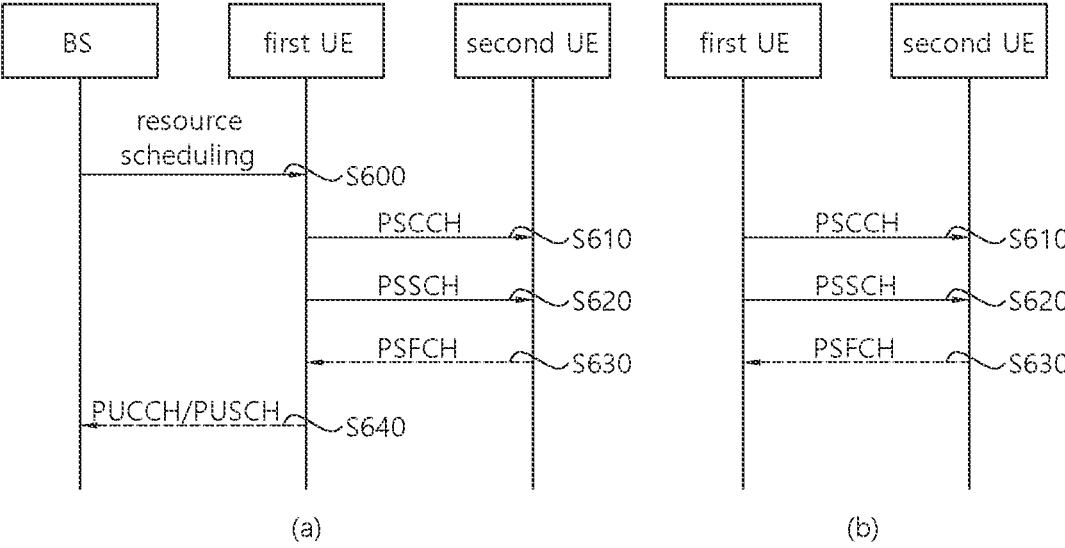
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s)

configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re) selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, a first UE may transmit SCI to a second UE on PSCCH. Alternatively, for example, a first UE may transmit two consecutive SCI (e.g., 2-stage SCI) to a second UE on PSCCH and/or PSSCH. In this case, a second UE may decode two consecutive SCIs (e.g., 2-stage SCI) in order to receive the PSSCH from a first UE. In this specification, SCI transmitted on PSCCH may be referred to as a 1st SCI, SCI 1, 1st-stage SCI or 1st-stage SCI format, and SCI transmitted on the PSSCH may be referred to as a 2nd SCI, SCI 2, 2nd-stage SCI or 2nd-stage SCI format. For example, the 1st-stage SCI format may include SCI format 1-A, and the 2nd-stage SCI format may include SCI format 2-A and/or SCI format 2-B. Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment-ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel} (N^{SL}_{subChannel}+1)(2N^{SL}subChannel+1)/6)$ bits when the value of the higher layer $\log_2$ (NSL parameter sl-MaxNumPerReserve is configured to 3

Time resource assignment-5 bits when the value of the higher layer parameter sl-MaxNumPerReserve is configured to 2; otherwise 9 bits when the value of the higher layer parameter sl-MaxNumPerReserve is configured to 3

Resource reservation period-ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern-ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format-2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number-4 bits

New data indicator—1 bit

Redundancy version-2 bits

Source ID-8 bits

Destination ID-16 bits

HARQ feedback enabled/disabled indicator—1 bit

Cast type indicator—2 bits as defined in Table 7

CSI request-1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630; a first UE may receive the PSFCH. For example, a first UE and a second UE may determine PSFCH resources, and a second UE may transmit HARQ feedback to a first UE using the PSFCH resource.

Referring to (a) of FIG. 6, in step S640, the first UE may transmit SL HARQ feedback to the base station through the PUCCH and/or the PUSCH.

Figure 7:
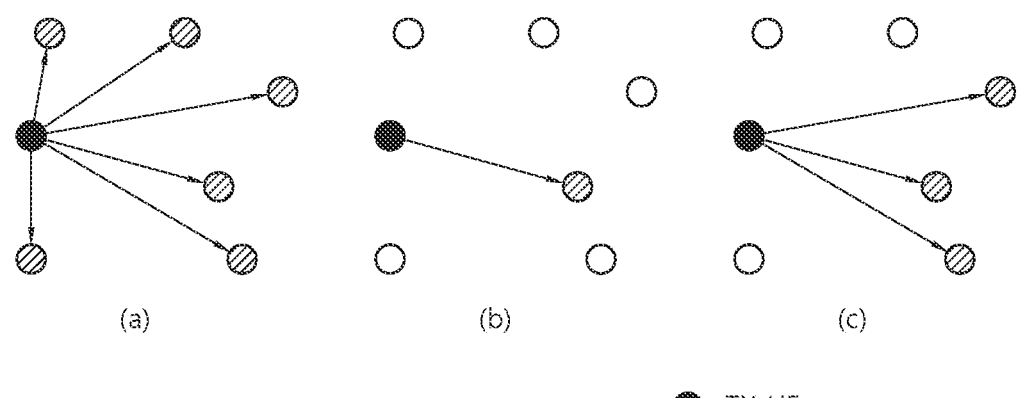
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, a UE procedure for determining a subset of resources to be reported to an higher layer in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
L1 priority, priorx;
the remaining packet delay budget;
the number of sub-channels to be used for the PSSCH/PSCCH transmission in a slot, LsubCH;
optionally, the resource reservation interval, $P_{rsvp\_TX}$, in units of msec.
if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \dots )$ which may be subject to re-evaluation and a set of resources $$(r'_0, r'_1, r'_2, \dots )$$

which may be subject to pre-emption.

it is up to UE implementation to determine the subset of resources as requested by higher layers before or after the slot $$r''_i - T_3, \text{ where } r''_i$$

is the slot with the smallest slot index among $(r_0, r_1, r_2, \dots )$ and $$(r'_0, r'_1, r'_2, \dots ),$$

and $T_3$ is equal to $$T^{SL}_{proc,1}, \text{ where } T^{SL}_{proc,1}$$

is defined in slots, and where Usz is the SCS configuration of the SL BWP.

The following higher layer parameters affect this procedure:

sl-SelectionWindowList: internal parameter T2 min is set to the corresponding value from higher layer parameter sl-Selection WindowList for the given value of $prio_{TX}$.
sl-Thres-RSRP-List: this higher layer parameter provides an RSRP threshold for each combination (Pi, Pj), where pi is the value of the priority field in a received SCI format 1-A and p; is the priority of the transmission of the UE selecting resources; for a given invocation of this procedure, Pj=priorx.
sl-RS-ForSensing selects if the UE uses the PSSCH-RSRP or PSCCH-RSRP measurement.
sl-ResourceReservePeriodList
sl-SensingWindow: internal parameter To is defined as the number of slots corresponding to sl-Sensing Window msec.
sl-TxPercentageList: internal parameter X for a given priorx is defined as sl-TxPercentageList (priorx) converted from percentage to ratio.
sl-PreemptionEnable: if sl-PreemptionEnable is provided, and if it is not equal to
'enabled', internal parameter priopre is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

$$(t'^{SL}_0, t'^{SL}_1, t'^{SL}_2, \dots )$$

may denote the set of slots which belongs to the sidelink resource pool.

For example, a UE may select a set of candidate resources (Sa) based on Table 8. For example, when resource (re) selection is triggered, a UE may select a candidate resource set (Sa) based on Table 8. For example, when re-evaluation or pre-emption is triggered, a UE may select a candidate resource set (Sa) based on Table 8.

TABLE 8

The following steps are used:
1) A candidate single-slot resource for transmission $R_{x,y}$ is defined as a set of $L_{subCH}$ contiguous sub-channels with sub-channel $x + j$ in slot $t'^{SL}_y$ where $j = 0, \dots , L_{subCH} - 1$.

The UE shall assume that any set of $L_{subCH}$ contiguous sub-channels included in the corresponding resource pool within the time interval $[n + T_1, n + T_2]$ corresponding to one candidate single-slot resource, where selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;
if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).
The total number of candidate single-slot resources is denoted by $M_{total}$.
2) The sensing window is defined by the range of slots $[n - T_0, n - T^{SL}_{proc,0})$ where $T_0$ is defined above and $T^{SL}_{proc,0}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i, p_j)$ is set to the corresponding value of RSRP threshold indicated by the i-th field in sl-Thres-RSRP-List, where $i = p_i + (p_j - 1) * 8$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{\prime SL}$ in Step 2.

for any periodicity value allowed by the higher layer parameter sl-

ResourceReservePeriodList and a hypothetical SCI format 1-A received in slot $t_m^{\prime SL}$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:

a) the UE receives an SCI format 1-$A$ in slot $t_m^{\prime SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $Th(prio_{RX}, prio_{TX})$;

c) the SCI format received in slot $t_m^{\prime SL}$ or the same SCI format which, if and only if the 'Resource reservation period' field is present in the received SCI format 1-A, is assumed to be recived in slot(s) $t_{m+q \times P_{rsvp\_RX}^{\prime}}^{\prime SL}$ determines according to clause 8.1.5 the set of resource blocks and slots which overlaps with $R_{x,y+j \times P_{rsvp\_RX}^{\prime}}$ for $q = 1, 2, \ldots, Q$ and $j = 0, 1, \ldots, C_{resel} - 1$. Here, $P_{rsvp\_RX}^{\prime}$ is $P_{rsvp\_RX}$ converted to units of logical slots according to clause 8.1.7, $Q = \left\lceil \dfrac{T_{scal}}{P_{rsvp\_RX}} \right\rceil$ if $P_{rsvp\_RX} < T_{scal}$ and $n' - m \leq P_{rsvp\_RX}^{\prime}$, where $t_{n'}^{\prime SL} = n$ if slot $n$ belongs to the set $\left(t_0^{\prime SL}, t_1^{\prime SL}, \ldots, t_{T_{max}^{\prime}-1}^{\prime SL}\right)$, otherwise slot $t_{n'}^{\prime SL}$ is the first slot after slot n belonging to the set $\left(t_0^{\prime SL}, t_1^{\prime SL}, \ldots, t_{T'max-1}^{\prime SL}\right)$; otherwise $Q = 1$.

$T_{scal}$ is set to selection window size $T_2$ converted to units of msec.

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.

If a resource $r_i$ from the set $(r_0, r_1, r_2, \ldots)$ is not a member of $S_A$, then the UE shall report re-evaluation of the resource $r_i$ to higher layers.

If a resource $r_i'$ from the set $(r_0', r_1', r_2', \ldots)$ meets the conditions below then the UE shall report pre-emption of the resource $r_i'$ to higher layers $r_i'$ is not a member of $S_A$, and $r_i'$ meets the conditions for exclusion in step 6, with $Th(prio_{RX}, prio_{TX})$ set to the final threshold after executing steps 1)-7), i.e. including all necessary increments for reaching $X \cdot M_{total}$ and the associated priority $prio_{RX}$, satisfies one of the following conditions:

sl-PreemptionEnable is provided and is equal to 'enabled' and $prio_{TX} > prio_{RX}$ sl-PreemptionEnable is provided and is not equal to 'enabled', and $prio_{RX} <$ $prio_{pre}$ and $prio_{TX} > prio_{RX}$ Meanwhile, partial sensing may be supported tor power saving of the UE. For example, in LTE SL or LTE V2X, the UE may perform partial sensing based on Tables 9 and 10.

TABLE 9

In sidelink transmission mode 4, when requested by higher layers in subframe n for a carrier, the UE shall determine the set of resources to be reported to higher layers for PSSCH transmission according to the steps described in this Subclause, Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers. Creset is determined by $C_{reset} = 10 * \text{SL\_RESOURCE\_RESELECTION\_COUNTER}$, where SL_RESOURCE_RESELECTION_COUNTER is provided by higher layers.

. . .

If partial sensing is configured by higher layers then the following steps are used:

1) A candidate single-subframe resource for PSSCH transmission Rxy is defined as a set of $L_{subCH}$ contiguous sub-channels with sub-channel $x + j$ in subframe $t_y^{SL}$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$. UE selection of $T_2$. shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if $k$-$th$ bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where $i = (a - 1) * 8 + b$.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively.

PSSCH-RSRP measurement according to the received SCI format 1 is higher than $Th_{prioTX,prioRX}$.

the SCI format received in subframe $t_m^{SL}$ or the same SCI format 1 which is 14.1.1.4C the set of resource blocks and subframes which overlaps with $R_{x,y+j \times P_{rsvp\_TX}}$, for $q = 1, 2, \ldots, Q$ and $j = 0, 1, \ldots, C_{reset} - 1$. Here, $Q = \dfrac{1}{P_{rsvp\_RX}}$ if $P_{rsvp\_RX} < 1$ and $y' - $ $m \le P_{step} \times P_{rsvp\_RX} + P_{step}$, where $t_{y'}^{SL}$ is the last subframe of the Y subframes, and $Q = 1$ otherwise.

6) If the number of candidate single-subframe resources remaining in the set $S_A$ is smaller than $0.2 \cdot M_{total}$, then Step 4 is repeated with $Th_{a,b}$ increased by 3 dB.

TABLE 10

7)    For a candidate single-subframe resource $R_{x,y}$ remaining in the set $S_A$, the metric $E_{x,y}$ is defined as the linear average of S-RSSI measured in sub-channels $x + k$ for $k = 0, \ldots, L_{subCH} - 1$ in the monitored subframes in Step 2 that can be expressed by $t^{SL}_{y-P_{step}*j}$ for a non-negative integer j.
8)    The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9)    When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.
The UE shall report set $S_B$ to higher layers.
If transmission based on random selection is configured by upper layers and when the UE is configured by upper layers to transmit using resource pools on multiple carriers, the following steps are used:
1)    A candidate single-subframe resource for PSSCH transmission $R_{x,y}$ is defined as a set of $L_{subCH}$ contiguous sub-channels with subchannel $x+j$ in subframe $t^{SL}_y$ where $j = 0, \ldots, L_{subCH} - 1$. The UE shall assume that any set of $L_{subCH}$ contiguous sub-channels included in the corresponding PSSCH resource pool within the time interval $[n + T_1, n + T_2]$ corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
2)    The set $S_A$ is initialized to the union of all the candidate single-subframe resources. The set $S_B$ is initialized to an empty set.
3)    The UE moves the candidate single-subframe resource $R_{x,y}$ from the set $S_A$ to $S_B$.
4)    The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.
The UE shall report set $S_B$ to higher layers.

Figure 8:
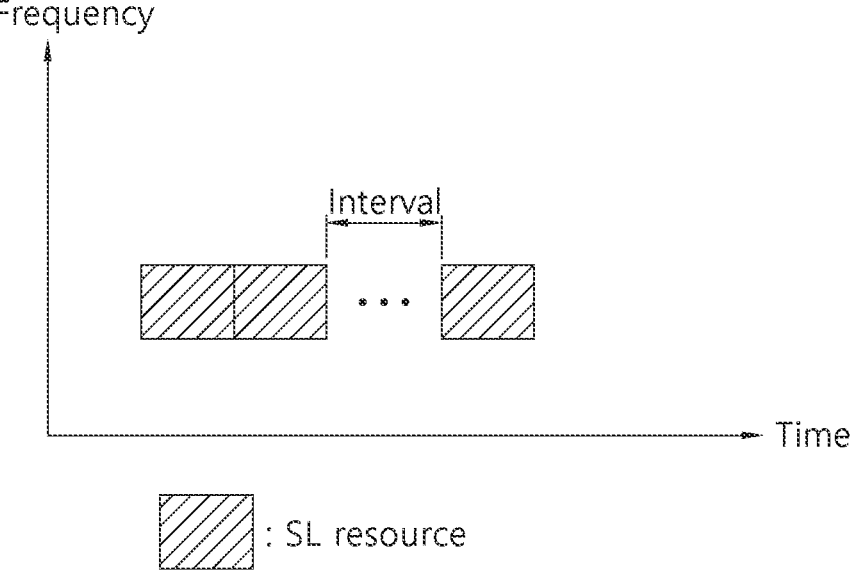
FIG. 8 shows an example of a burst resource according to an embodiment of the present disclosure.

FIG. 8 shows an example of a burst resource according to an embodiment of the present disclosure. The embodiment of FIG. 8 may be combined with various embodiments of the present disclosure.

Referring to FIG. 8, a UE may select/determine a plurality of resources. For example, a UE may select/determine a plurality of resources within a resource pool. For example, the plurality of resources may be continuous resources in the time region. For example, the plurality of resources may be resources with a time interval (e.g., slot interval) within a threshold in the time region.

Figure 9:
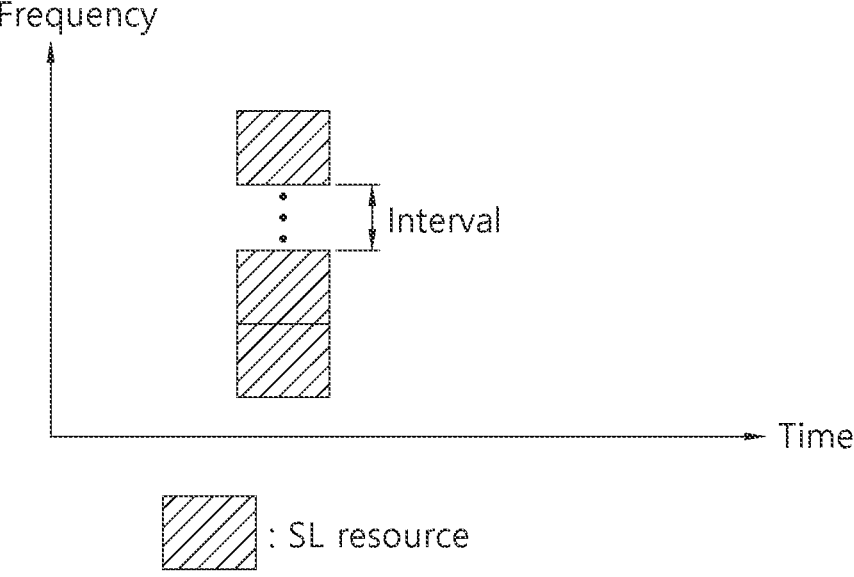
FIG. 9 shows an example of a burst resource according to an embodiment of the present disclosure.

FIG. 9 shows an example of a burst resource according to an embodiment of the present disclosure. The embodiment of FIG. 9 may be combined with various embodiments of the present disclosure.

Referring to FIG. 9, a UE may select/determine a plurality of resources. For example, a UE may select/determine a plurality of resources within a resource pool. For example, the plurality of resources may be continuous resources in the frequency domain. For example, the plurality of resources may be resources with frequency intervals (e.g., RB intervals or subchannel intervals) within a threshold in the frequency domain.

Meanwhile, SL communication needs to be performed based on aggregated resources (e.g., burst resources) in NR V2X. For example, an aggregated resource be a contiguous set of resources (e.g., a contiguous set of resources in the time domain and/or frequency domain). For example, an aggregated resources may be a set of resources with an interval within a threshold (e.g., a set of resources spaced apart within a threshold in the time domain and/or frequency domain). Hereinafter, the reason why aggregated resource-based SL communication is required in NR V2X will be described in detail.

For example, unlike LTE V2X, aperiodic transmission is supported in NR V2X. Compared to periodic transmission, aperiodic transmission has a high possibility of transmission failure due to channel congestion or the like within a packet delay budget (PDB) of a packet from the time of packet generation. Accordingly, a UE may perform burst transmission by selecting aggregated resources for aperiodic transmission, thereby maximizing the transmission success probability within the PDB.

For example, unlike LTE V2X, in NR V2X, packets with strict delay requirements need to be transmitted. Table 11 shows the mapping between Standardized PQI and QoS characteristics.

TABLE 11

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 21 | GBR (NOTE 1) | 3 | 20 ms | $10^{-4}$ | N/A | 2000 ms | Platooning between UEs - Higher degree of automation; Platooning between UE and RSU - Higher degree of automation |
| 22 | | 4 | 50 ms | $10^{-2}$ | N/A | 2000 ms | Sensor sharing - higher degree of automation |
| 23 | | 3 | 100 ms | $10^{-4}$ | N/A | 2000 ms | Information sharing for automated driving - between UEs or UE and RSU - higher degree of automation |

TABLE 11-continued

| PQI Value | Resource Type | Default Priority Level | Packet Delay Budget | Packet Error Rate | Default Maximum Data Burst Volume | Default Averaging Window | Example Services |
|---|---|---|---|---|---|---|---|
| 55 | Non-GBR | 3 | 10 ms | $10^{-4}$ | N/A | N/A | Cooperative lane change - higher degree of automation |
| 56 | | 6 | 20 ms | $10^{-1}$ | N/A | N/A | Platooning informative exchange - low degree of automation; Platooning - information sharing with RSU |
| 57 | | 5 | 25 ms | $10^{-1}$ | N/A | N/A | Cooperative lane change - lower degree of automation |
| 58 | | 4 | 100 ms | $10^{-2}$ | N/A | N/A | Sensor information sharing - lower degree of automation |
| 59 | | 6 | 500 ms | $10^{-1}$ | N/A | N/A | Platooning - reporting to an RSU |
| 90 | Delay Critical GBR (NOTE 1) | 3 | 10 ms | $10^{-4}$ | 2000 bytes | 2000 ms | Cooperative collision avoidance; Sensor sharing - Higher degree of automation; Video sharing - higher degree of automation |
| 91 | | 2 | 3 ms | $10^{-5}$ | 2000 bytes | 2000 ms | Emergency trajectory alignment; Sensor sharing - Higher degree of automation |

(NOTE 1):
GBR and Delay Critical GBR PQIs can only be used for unicast PC5 communications.

Referring to Table 11, the PDB corresponding to PQI 91 is 3 ms. In this case, in the case of 15 kHz, a UE must transmit the corresponding packet within 3 slots. If aggregated resources are not supported, a UE can transmit a packet corresponding to PQI 91 using only one slot, and if the transmission fails, the UE's retransmission opportunity may not be guaranteed. However, if aggregated transmission is supported, a UE can transmit packets corresponding to PQI 91 using 3 consecutive slots, and through this, the transmission success probability can be increased. For convenience of description, the description is based on PQI 91, but the same problem may occur in packets having tight delay requirements, such as PQI 55 and PQI 21.

Meanwhile, aggregated resource selection/reservation may be required to reduce UE power consumption. For example, a UE performing partial sensing or random resource selection (e.g., a power-saving UE) may perform full sensing for a short period of time prior to the selected transmission resource timing (hereinafter referred to as short-term sensing (STS)) in order to avoid resource collision due to aperiodic transmission. For example, since the STS is performed before each selected transmission resource, power consumption of a UE by the STS may increase when the selected resource is temporally distant.

Figure 10:
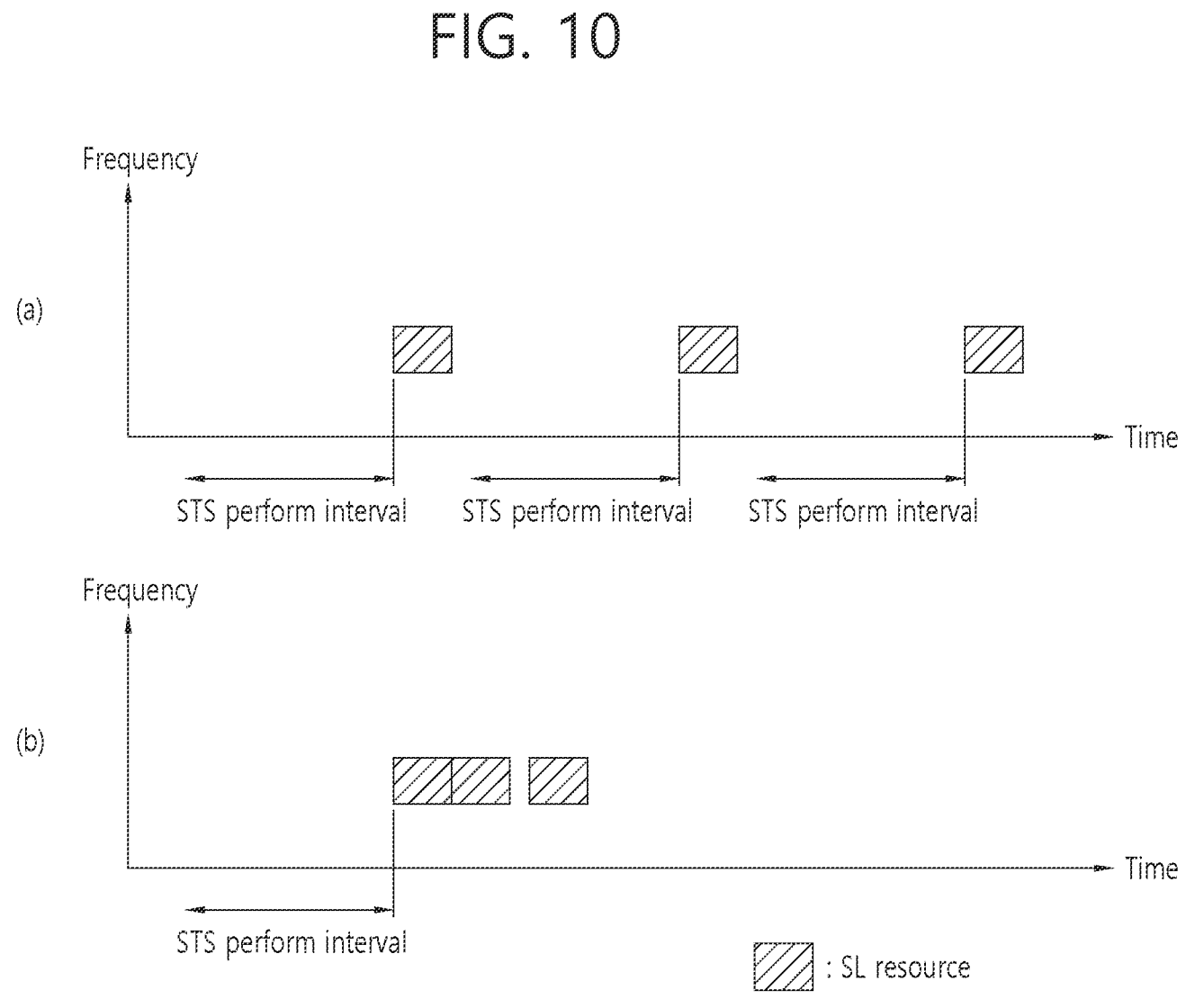

FIG. 10 is a figure for explaining why burst resource reservation is necessary.

Referring to (a) of FIG. 10, when three resources are far apart in time, in order to avoid resource collision due to aperiodic transmission, a UE needs to perform STS for each of the three resources. In this case, power consumption of the UE may increase due to the three STSs.

For example, in order to minimize power consumption of the UE by such an STS, when the UE selects resources based on partial sensing or random selection, the UE selects resources adjacent to each other within a resource selection window. Referring to (b) of FIG. 10, the UE may select three adjacent resources within a resource selection window. In this case, the UE can avoid resource collision due to aperiodic transmission by performing one STS for three resources. Therefore, power consumption of the UE can be saved.

Due to the above reasons, aggregated resource-based SL transmission needs to be allowed in order to reduce power consumption of a UE, ensure reliability of SL communication, and increase resource use efficiency.

In this specification, the wording "configuration or definition" may be interpreted as being configured (in advance) by a base station or network (e.g., through predefined signaling (e.g., SIB, MAC signaling, RRC signaling). For example, "A may be configured" may include "a base station or network (pre) configures/defines or advertises A to a UE". Alternatively, the wording "configuration or definition" may be interpreted as being configured or defined in advance by system. For example, "A may be configured" may include "A is configured/defined in advance by system".

Referring to the standard document, some procedures and technical specifications relevant to this disclosure are as follows.

TABLE 12

3GPP TS 36.213 V16.2.0

14.1.1.6  UE procedure for determining the subset of resources to be reported to
higher layers in PSSCH resource selection in sidelink transmission
mode 4 and in sensing measurement in sidelink transmission mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{reset}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{reset}$ is determined by $C_{reset} = 10*SL\_RESOURCE\_RESELECTION\_COUNTER$, where SL_RESOURCE_RESELECTION_COUNTER is provided by higher layers [11].

. . .

TABLE 13

If partial sensing is configured by higher layers then the following steps are used:

1)  A candidate single-subframe resource for PSSCH transmission $R_{x,y}$ is defined as a set of $L_{subCH}$ contiguous sub-channels with sub-channel $x + j$ in subframe $t_y^{SL}$ where $j =$ $0, \ldots , L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}$ ($prio_{TX}$) $\le T_2 \le 100$, if $T_{2min}$ ($prio_{TX}$) is provided by higher layers for $prio_{TX}$, otherwise $20 \le T_2 \le 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2)  If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3)  The parameter $Th_{a,b}$ is set to the value indicated by the i-th SL-ThresPSSCH-RSRP field in SL-ThresPSSCH-RSRP-List where $i = (a - 1) * 8 + b$.

4)  The set $S_A$ is initialized to the union of all the candidate single-subframe resources. The set $S_B$ is initialized to an empty set.

5)  The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values Prsvp RX and $prio_{RX}$, respectively according to Subclause 14.2.1.
PSSCH-RSRP measurement according to the received SCI format 1 is higher than $Th_{prioTX,prioRX}$.

the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$, for $q = 1, 2, \ldots , Q$ and $j = 0, 1, \ldots , C_{reset} - 1$. Here, $Q = \dfrac{1}{P_{rsvp\_RX}}$ if $P_{rsvp\_RX} < 1$ and $y' - m \le P_{step} \times P_{rsvp\_RX} + P_{step}$, where $t_{y'}^{SL}$ is the last subframe of the Y. subframes . and $Q = 1$ otherwise.

TABLE 14

6) If the number of candidate single-subframe resources remaining in the set $S_A$ is smaller than $0.2 \cdot M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels $x + k$ for $k = 0, \ldots, L_{subCH} - 1$ in the monitored subframes in Step 2 that can be expressed by $t^{SL}_{y - P_{step} * j}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

TABLE 15

The UE shall report set $S_B$ to higher layers.
If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel $x+j$ in subframe $t^{SL}_y$ where $j = 0, \ldots, L_{subCH} - 1$. The UE shall assume that any set of $L_{subCH}$ contiguous sub-channels included in the corresponding PSSCH resource pool (described in 14.1.5) within the time interval $[n + T_1, n + T_2]$ corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The set $S_A$ is initialized to the union of all the candidate single-subframe resources. The set $S_B$ is initialized to an empty set.

3) The UE moves the candidate single-subframe resource $R_{x,y}$ from the set $S_A$ to $S_B$.

4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].
The UE shall report set $S_B$ to higher layers.

On the other hand, the existing SL resource selection window and candidate resource selection method are not suitable for the resource re-evaluation and pre-emption of power-saving UEs.

According to one embodiment of the present disclosure, a resource selection window and candidate resource selection method and device for supporting the same are proposed that minimize the power consumption required for a power saving UE to perform resource reevaluation and pre-emption.

For example, for (or, for each of) at least one among elements/parameters of service type (and/or (LCH or service) priority and/or QoS requirements (e.g., latency, reliability, minimum communication range) and/or PQI parameters) (and/or HARQ feedback enabled (and/or disabled)

LCH/MAC PDU (transmission) and/or CBR measurement value of a resource pool and/or SL cast type (e.g., unicast, groupcast, broadcast) and/or SL groupcast HARQ feedback option (e.g., NACK only feedback, ACK/NACK feedback, NACK only feedback based on TX-RX distance) and/or SL mode 1 CG type (e.g., SL CG type 1/2) and/or SL mode type (e.g., mode 1/2) and/or resource pool and/or PSFCH resource configured resource pool and/or source (L2) ID (and/or destination (L2) ID) and/or PC5 RRC connection/link and/or SL link and/or (with base station) connection state (e.g., RRC connected state, IDLE state, inactive state) and/or whether an SL HARQ process (ID) and/or (of a transmitting UE or a receiving UE) performs an SL DRX operation and/or whether it is a power saving (transmitting or receiving) UE and/or (from the perspective of a specific UE) case when PSFCH transmission and PSFCH reception (and/or a plurality of PSFCH transmissions (exceeding UE capability)) overlap (and/or a case where PSFCH transmission (and/or PSFCH reception) is omitted) and/or a case where a receiving UE actually (successfully) receives a PSCCH (and/or PSSCH) (re) transmission from a transmitting UE, etc.), whether the rule is applied (and/or the proposed method/rule-related parameter value of the present disclosure) may be specifically (or differently_or independently) configured/allowed. In addition, in the present disclosure, "configuration" (or "designation") wording may be extended and interpreted as a form in which a base station informs a UE through a predefined (physical layer or higher layer) channel/signal (e.g., SIB, RRC, MAC CE) (and/or a form provided through pre-configuration and/or a form in which a UE informs other UEs through a predefined (physical layer or higher layer) channel/signal (e.g., SL MAC CE, PC5 RRC)), etc. In addition, in this disclosure, the "PSFCH" wording may be extended and interpreted as "(NR or LTE) PSSCH (and/or (NR or LTE) PSCCH) (and/or (NR or LTE) SL SSB (and/or UL channel/signal))". And, the methods proposed in the present disclosure may be used in combination with each other (in a new type of manner).

For example, a "specific threshold" may mean a threshold predefined or (pre-) configured by a higher layer (including an application layer) of the network or base station or UE. The term "specific configuration value" may mean a value predefined or (pre-) configured by the network or higher layers (including application layers) of the base station or UE. The term "configured by the network/base station" may refer to an operation that a base station (pre-) configures to a UE by upper layer RRC signaling, configures/signals to a UE via MAC CE, or signals to a UE via DCI.

For example, when resource re-evaluation or pre-emption checking is allowed in an SL resource pool and/or when contiguous partial sensing (CPS) for resource re-evaluation or pre-emption checking is allowed in an SL resource pool, when CPS for resource re-evaluation or pre-emption checking is performed after a power-saving UE (P-UE) selects transmission resources, the larger the time interval between the previously selected transmission resources, the longer the CPS interval that needs to be performed with respect to each selected transmission resource, and consequently, the higher the power consumption for performing CPS. To solve the above problem, a P-UE may select the transmission resources in a burst type, wherein the transmission resources are temporally adjacent to each other and/or the time interval occupied by the entire transmission resource is short. According to an embodiment of the present disclosure, a burst type transmission resource may be selected in the following three ways. For example, the term "burst" in this disclosure may be interpreted interchangeably with the term "cluster".

According to one embodiment of the present disclosure, a P-UE may determine the length and position of the resource selection window as follows.

For example, the length of a resource selection window may be expressed in physical slots (or symbols), or UL logical slots (or symbols) available for SL transmissions, or the number of SL logical slots (or symbols) included in an SL resource pool.

For example, the length of the resource selection window may be determined by a UE implementation in a range greater than or equal to a specific threshold representing a minimum value, and less than or equal to a specific threshold representing a maximum value. For example, the specific threshold representing the minimum value and the specific threshold representing the maximum value may be configured differently depending on whether the HARQ feedback enabled (or disabled) MAC PDUs are transmitted and/or the congestion/interference level within a resource pool and/or QoS requirements such as reliability/latency and/or service/packet priority.

For example, the length of the resource selection window may be determined by a UE implementation in a range greater than or equal to a specific threshold meaning the minimum value and less than or equal to a specific threshold meaning the maximum value, wherein the number of slots (or symbols) within the resource selection window having at least one valid candidate frequency resource (hereinafter referred to as an idle resource) that remains unexcluded from the candidate transmission resource selection procedure is greater than or equal to the maximum number of retransmissions of the packet to be transmitted.

For example, the reference start time point n of the resource selection window, having a length within the specific threshold, may be one of a time point when the resource (re) selection is triggered, a time point when the resource (re) selection is triggered plus a UE processing time $T\_proc$, 1, a time point when the transmission packet is generated and delivered to the AS layer, or a time point when the transmission packet is generated and delivered to the AS layer plus a UE processing time $T\_proc,1$.

For example, the resource selection window may be configured such that a resource (slot or symbol) randomly selected from among resources (slots or symbols) within a packet delay budget (PDB) from a reference start time point n of the resource selection window, and having a length within the specific threshold, may be configured. In this case, the resource (slot, or symbol) within the PDB may be one of a physical slot (or symbol), a UL logical slot (or symbol) available for SL transmission, or an SL logical slot (or symbol) included in an SL resource pool.

For example, the resource selection window having a length within the specific threshold and having the earliest resource (slot or symbol) as a starting point among the resources (slots or symbols) within a packet delay budget (PDB) from a reference starting time point n of the resource selection window may be configured. In this case, the resource (slot, or symbol) within the PDB may be one of a physical slot (or symbol), a UL logical slot (or symbol) available for SL transmission, or an SL logical slot (or symbol) included in an SL resource pool.

For example, a resource selection window having a length within a specific threshold and having a randomly selected resource (slot or symbol) as a starting point among resources (slots or symbols) within a specific configuration value less than a packet delay budget (PDB) from a reference starting time point n of the resource selection window may be configured. In this case, the resource (slot, or symbol) within a specific configuration value less than the packet delay budget (PDB) may be one of a physical slot (or symbol), a UL logical slot (or symbol) available for SL transmission, or an SL logical slot (or symbol) included in an SL resource pool.

For example, after selecting one or more candidate resource selection windows within a packet delay budget (PDB) from a reference start time point n of the resource selection window, one of the one or more candidate resource selection windows may be selected as a final resource selection window based on the results of performing periodic partial sensing (PPS) on the selected candidate resources (slots, or symbols) within each candidate resource selection window.

Here, for example, the length of the candidate resource selection window may be expressed as a number of physical slots (or symbols), UL logical slots (or symbols) available for SL transmissions, or SL logical slots (or symbols) included in an SL resource pool.

In addition, for example, the length of the candidate resource selection window may be determined by a UE implementation, in a range greater than or equal to a specific threshold representing a minimum value and less than or equal to a specific threshold representing a maximum value. The specific threshold representing the minimum value and the specific threshold representing the maximum value may be configured differently per service/packet priority and/or QoS requirements such as congestion level/interference level and/or reliability/delay within a resource pool and/or whether to transmit MAC PDU with a HARQ feedback enabled (or disabled).

In addition, for example, the length of the candidate resource selection window may be determined by a UE implementation to be in a range greater than or equal to a specific threshold meaning the minimum value and less than or equal to a specific threshold meaning the maximum value, wherein the number of slots (or, symbols) within the candidate resource selection window having at least one valid candidate frequency resource (hereinafter, an idle resource) that remains unexcluded from the candidate transmission resource selection procedure is greater than or equal to a maximum number of retransmissions of the packet to be transmitted.

In addition, for example, the final resource selection window may be selected based on a PPS result for a candidate resource (slot, or symbol) within each candidate resource selection window, in association with an RSRP value for idle resources and/or busy resources (resources excluded from the transmission resource selection process) within the candidate resource. For example, the candidate resource selection window having the smallest average RSRP for the idle and/or busy resources within the candidate resources (slots, or symbols) within each candidate resource selection window may be selected as the final resource selection window. For example, a candidate resource selection window having an average RSRP below a specific threshold may be randomly selected as the final resource selection window.

In addition, for example, as a result of performing the above PPS, the candidate resource selection window with the highest number of valid candidate resources (idle resources) remaining that remain unexcluded from the candidate transmission resource selection procedure within each candidate resource selection window may be determined to be the final resource selection window.

In addition, for example, as a result of performing the above PPS, one candidate resource selection window may be randomly determined to be the final resource selection window among the candidate resource selection windows in which the number of valid candidate resources (idle resources) remaining unexcluded from the candidate transmission resource selection procedure within each candidate resource selection window is greater than a specific threshold.

In addition, for example, the locations of the plurality of candidate resource selection windows may be configured to a specific configuration value, or may be determined by a UE implementation in a range greater than or equal to a specific threshold representing a minimum value and less than or equal to a specific threshold representing a maximum value. For example, different candidate resource selection windows may be configured/determined not to overlap each other, or may be configured/determined to partially overlap. For example, the specific threshold representing minimum value and the specific threshold representing maximum value may be configured differently depending on whether MAC PDU with a HARQ feedback enabled (or disabled) to be transmitted, congestion level/interference within a resource pool, QoS requirements such as reliability/latency, and/or a service/packet priority.

In addition, for example, the PPS (which is performed for a selected candidate resource within each candidate resource selection window after selecting one or more candidate resource selection windows within the PDB from a reference start time point n of the resource selection window) may be configured and performed separately from the PPS associated with the candidate resource within the final resource selection window. For example, only a part of the PPS associated with the candidate resource in the resource selection window may be performed in the PPS. For example, among the transmission periods configured in a resource pool, a part of the transmission periods associated with the PPS associated with the candidate resource in the resource selection window may be configured to a specific configuration value, or otherwise determined by a UE implementation, and used for the PPS. For example, a bitmap used for a specific resource transmission period associated with a PPS associated with a candidate resource in the final resource selection window, or a subset of a number of partial sensing slots corresponding to an integer multiple of the resource transmission period may be used for the PPS.

For example, after selecting one or more of the candidate resource selection windows within a packet delay budget (PDB) from a reference start time point n of the resource selection window, one of the candidate resource selection windows may be selected as the final resource selection window based on a result of performing a CPS on a candidate resource within each of the candidate resource selection windows.

Here, for example, the CPS may be performed prior to the starting time point of each candidate resource selection window, or prior to the starting time point of each candidate resource selection window by a UE processing time (T_proc,0+T_proc, 1), prior to each candidate resource time point within each candidate resource selection window, or prior to each candidate resource time point within each candidate resource selection window by a UE processing time (T_proc,0+T_proc,1).

In addition, for example, the final resource selection window may be selected based on a CPS result for candidate resources (slots, or symbols) within each candidate resource selection window, in association with RSRP values for idle resources and/or busy resources (resources excluded from the transmission resource selection procedure) within the candidate resources. For example, a candidate resource selection window having the smallest average RSRP for idle and/or busy resources within candidate resources (slots, or symbols) within each candidate resource selection window may be selected as the final resource selection window. For example, a final resource selection window may be randomly selected from among candidate resource selection windows having an average RSRP below a specific threshold.

In addition, for example, as a result of performing the above CPS, a candidate resource selection window with the greatest number of valid candidate resources (idle resources) remaining unexcluded from the candidate transmission resource selection procedure within each candidate resource selection window may be determined to be the final resource selection window.

In addition, for example, as a result of performing the above CPS, one candidate resource selection window may be randomly determined to be the final resource selection window among the candidate resource selection windows in which the number of valid candidate resources (idle resources) remaining unexcluded from the candidate transmission resource selection procedure within each candidate resource selection window is greater than a specific threshold.

For example, the resource selection window may be determined based on RSSI or RSRP information obtained based on the results of a PPS or CPS performed for the transmission of a packet other than the packet at issue, among resources (slots or symbols) within a packet delay budget (PDB) from a reference start time point n of the resource selection window.

According to one embodiment of the present disclosure, after determining a resource selection window based on a specific configuration value or by a UE implementation, a P-UE may configure the number and location of candidate resources (slots, or symbols) within the resource selection window as follows.

For example, the total time region (time interval from the first candidate resource to the last candidate resource) that may be occupied by the candidate resources may be determined by a UE implementation to be less than or equal to a specific threshold. For example, the specific threshold may be configured differently per whether a MAC PDU with a HARQ feedback enabled (or, disabled) is transmitted, per congestion level/interference level within a resource pool, per QoS requirements such as reliability/latency, and/or per service/packet priority.

For example, a specific threshold for the total time region that may be occupied by the candidate resource (slot, or symbol) may be expressed as the number of physical slots (or symbols), UL logical slots (or symbols) available for SL transmission, or SL logical slots (or symbols) included in an SL resource pool. In this case, the candidate resource may be a resource (slot, or symbol) included in an SL transmission resource pool.

For example, the number of candidate resources may be determined by a UE implementation to be in the range that the number of slots (or, symbols) within a resource selection window that have at least one valid candidate frequency resource (hereinafter, an idle resource) that remains unexcluded from the candidate transmission resource selection procedure is greater than or equal to the maximum number of retransmissions of the packet to be transmitted.

For example, an interval between the candidate resources (slots, or symbols) in the resource selection window may be configured to a specific configuration value, or may be determined by a UE implementation within a specific threshold.

For example, the total time region (the time region including from the first candidate resource to the last candidate resource) that may be occupied by the candidate resources (slots, or symbols) may be configured to a specific configuration value, or may be determined by a UE implementation within a specific threshold.

For example, the time region covering the first candidate resource to the last candidate resource, which may be signaled by one SCI, may be configured to a specific configuration value or determined by a UE implementation within a specific threshold.

For example, for selection of the candidate resources, a CPS of a specific configuration value length may be performed prior to the start of the resource selection window, or prior to the start of the resource selection window by a UE processing time (T_proc,0+T_proc,1), and the candidate resources may be selected based on the results of the CPS. For example, the length of the CPS window may be configured to a value greater than or equal to a time region including from the first candidate resource to the last candidate resource, which can be signaled by one SCI.

For example, the candidate resources may be randomly selected from among resources (slots, or symbols) belonging to an SL resource pool, insofar as the candidate resources satisfy a condition that the candidate resources occupy a total time region that may be occupied by the candidate resources within the resource selection window. For example, the location of the candidate resource may be randomly selected within a total time region that may be occupied by the candidate resource from the temporally earliest candidate resource from the starting point of a resource selection window (or from the time point that is T_proc,1 later after the starting point). For example, the candidate resource may be selected from the temporally fastest candidate resource as a contiguous resource from among the resources belonging to an SL resource pool.

For example, within the resource selection window, a UE implementationally determined number of candidate burst occasions configured to a specific configuration value or within a specific threshold may be selected, and after PPS is performed for each candidate burst occasion, one of the candidate burst occasions may be selected as the burst occasion comprising the final candidate resource based on the PPS result. In this case, for example, the candidate burst occasions may refer to a unit comprising candidate resources for SL transmission.

Here, for example, a specific configuration value or a specific threshold associated with the number of candidate burst occasions may be configured differently depending on whether a MAC PDU with a HARQ feedback enabled (or, disabled) is transmitted, the congestion level/interference within a resource pool, QoS requirements such as reliability/latency, and/or service/packet priority.

In addition, for example, the total time region (time interval from the first candidate resource to the last candidate resource) that may be occupied by the candidate resources within each of the candidate burst occasions may be determined by a UE implementation to be less than or equal to a specific threshold. For example, the specific threshold may be configured differently depending on whether a MAC PDU with a HARQ feedback enabled (or, disabled) is transmitted, congestion level/interference within a resource pool, QoS requirements such as reliability/latency, and/or service/packet priority.

In addition, for example, the specific threshold for the total time region that may be occupied by the candidate resource (slot, or symbol) within each of the candidate burst occasions may be expressed as a number of physical slots (or symbols), UL logical slots (or symbols) available for SL transport, or SL logical slots (or symbols) included in an SL resource pool. In this case, the candidate resource may be a resource (slot, or symbol) included in an SL transmission resource pool.

In addition, for example, the number of candidate resources within each of the candidate burst occasions may be determined by the UE implementation to be in the range that the number of slots (or, symbols) having one or more valid candidate frequency resources (hereinafter, idle resources) that remain unexcluded during the candidate transmission resource selection procedure is greater than or equal to the maximum number of retransmissions of the packet to be transmitted.

In addition, for example, an interval between the candidate resources (slots, or symbols) within each of the candidate burst occasions may be configured to a specific configuration value, or may be determined by the UE implementation within a specific threshold.

In addition, for example, the total time region (the time region including from the first candidate resource to the last candidate resource) that may be occupied by the candidate resources (slots, or symbols) within each of the candidate burst occasions may be configured to a specific configuration value, or determined by the UE implementation within a specific threshold.

In addition, for example, the burst occasion comprising the final candidate resource among the candidate burst occasions may be selected based on RSRP values for idle resources and/or busy resources (resources excluded from the transmission resource selection process) within the candidate resources, based on the PPS results for the candidate resources (slots, or symbols) within each candidate burst occasion. For example, a candidate resource selection window having the smallest average RSRP for idle resources and/or busy resources within the candidate resources (slots, or symbols) within each candidate resource selection window may be selected as the final resource selection window. For example, a final resource selection window may be randomly selected from among candidate resource selection windows having an average RSRP below a specific threshold.

In addition, for example, the average RSRP may be an average of the RSRPs for a representative candidate frequency resource (e.g., a subchannel or resource element) within each candidate resource (slot, or symbol). For example, the representative candidate frequency resource may be the frequency resource with the lowest RSRP within each candidate slot, or may be a frequency resource randomly selected from among frequency resources with RSRPs below a specific threshold. For example, a specific threshold associated with the average RSRP and a specific threshold associated with the representative candidate frequency resource RSRP may be configured differently and separately.

In addition, for example, as a result of performing the above PPS, a candidate burst occasion with the highest number of valid candidate resources (idle resources) remaining unexcluded from the candidate transmission resource selection procedure within each candidate burst occasion may be determined to be the final burst occasion.

In addition, for example, as a result of performing the above PPS, one candidate burst occasion may be randomly determined to be the final burst occasion among the candidate burst occasions in which the number of valid candidate resources (idle resources) remaining unexcluded from the candidate transmission resource selection procedure within each candidate burst occasion is greater than a specific threshold.

In addition, for example, the plurality of candidate burst occasion locations may be configured to a specific configuration value, or may be determined by a UE implementation in a range greater than or equal to a specific threshold representing a minimum value and less than or equal to a specific threshold representing a maximum value. For example, different candidate burst occasions may be configured/determined not to overlap each other, or may be configured/determined to partially overlap. For example, a specific threshold representing minimum value and a specific threshold representing maximum value may be configured differently depending on whether MAC PDU with a HARQ feedback enabled (or disabled) is transmitted, congestion level/interference within a resource pool, QoS requirements such as reliability/latency, and/or service/ packet priority.

In addition, for example, the PPS may be separately configured and performed from a PPS associated with a candidate resource in the final resource selection window. For example, the PPS may perform only a part of the PPS associated with the candidate resource in a resource selection window. For example, among the transmission periods configured in a resource pool, a part of the transmission periods associated with the PPS associated with the candidate resource in the resource selection window may be configured to a specific configuration value or otherwise determined by the UE implementation and used for the PPS. For example, a bitmap used for a specific resource transmission period associated with a PPS associated with a candidate resource in the final resource selection window, or a subset of a number of partial sensing slots corresponding to integer multiples of the resource transmission period may be used for the PPS.

FIG. 11 shows a procedure for a UE to determine a set of candidate resources, according to one embodiment of the present disclosure. The embodiment of FIG. 11 may be combined with various embodiments of the present disclosure.

Referring to FIG. 11, a UE may determine a set of candidate resources within a selection window, wherein the length of a time region occupied by the candidate resources is less than a specific time threshold. Referring to (a) of FIG. 11, a selection window for selecting SL transmission resources and resources that may be used for SL transmission within the selection window are shown. For example, the UE of FIG. 11 may be a power saving UE. In (a) of FIG. 11, the UE may identify resources that may be used for the SL transmission based on sensing. For example, a crossed-out shape may represent a resource that may be used for SL transmission under specific conditions. For example, the resources that may be used for the SL transmission may be resources having an RSRP below a threshold.

Referring to (b) of FIG. 11, the crossed-out shapes may be resources that a UE attempts to determine as a set of candidate resources. However, in (b) of FIG. 11, the resources that the UE attempts to determine as a set of candidate resources may not be allowed to be determined as a set of candidate resources because the time region from the first resource to the last resource of the resources that the UE attempts to determine as a set of candidate resources is greater than a specific time threshold.

On the other hand, referring to (c) of FIG. 11, a time region from the first resource to the last resource among the resources that the UE attempts to determine as a set of candidate resources is less than a specific time threshold, and thus the UE may determine the resources that the UE attempts to determine as a set of candidate resources as a set of candidate resources. For example, the UE may forward the determined set of candidate resources to a higher layer. For example, the higher layer may be a MAC layer.

For example, within the resource selection window, a UEly UE implementationally determined number of candidate burst occasions which is configured to a specific configuration value or within a specific threshold may be selected, and after CPS is performed on each candidate burst occasion, one of the candidate burst occasions may be selected as the burst occasion comprising the final candidate resource based on the results of the CPS.

Here, for example, the CPS may be performed prior to the starting time point of the resource selection window, or prior to the starting time point of the resource selection window by a UE processing time (T_proc,0+T_proc,1), prior to each candidate resource time point within each candidate burst occasion, or prior to each candidate resource time point within each candidate burst occasion by a UE processing time (T_proc,0+T_proc,1).

In addition, for example, a specific configuration value or a specific threshold associated with the number of candidate burst occasions may be configured differently depending on whether a MAC PDU with a HARQ feedback enabled (or, disabled) is transmitted, congestion level/interference within a resource pool, QoS requirements such as reliability/latency, and/or service/packet priority.

In addition, for example, the total time region (time interval from the first candidate resource to the last candidate resource) that may be occupied by candidate resources within each of the candidate burst occasions may be determined by a UE implementation to be less than or equal to a specific threshold. The specific threshold may be configured differently per whether a MAC PDU with a HARQ feedback enabled (or, disabled) is transmitted, congestion level/interference within a resource pool, QoS requirements such as reliability/latency, and/or service/packet priority.

In addition, for example, the number of candidate resources within each of the candidate burst occasions may be determined by a UE implementation to be in the range that the number of slots (or, symbols) having one or more valid candidate frequency resources (hereinafter, idle resources) that remain unexcluded during the candidate transmission resource selection procedure is greater than or equal to the maximum number of retransmissions of the packet to be transmitted.

In addition, for example, an interval between the candidate resources (slots, or symbols) within each of the candidate burst occasions may be configured to a specific configuration value, or may be determined by a UE implementation within a specific threshold.

In addition, for example, the total time region (the time region including from the first candidate resource to the last candidate resource) that may be occupied by the candidate resources (slots, or symbols) within each of the candidate burst occasions may be configured to a specific configuration value, or determined by a UE implementation within a specific threshold.

In addition, for example, the burst occasion comprising the final candidate resource among the candidate burst occasions may be selected based on the RSRP values for idle resources and/or busy resources (resources excluded from the transmission resource selection procedure) within the candidate resources, based on the CPS results for the candidate resources (slots, or symbols) within each candidate burst occasion. For example, a candidate resource selection window having the smallest average RSRP for idle resources and/or busy resources within the candidate resources (slots, or symbols) within each candidate resource selection window may be selected as the final resource selection window. For example, the final resource selection window may be randomly selected from among candidate resource selection windows having an average RSRP below a specific threshold.

In addition, for example, the average RSRP may be an average value over the RSRPs for a representative candidate frequency resource (e.g., subchannel or resource element) within each candidate resource (slot, or symbol). For example, the representative candidate frequency resource may be the frequency resource with the lowest RSRP within each candidate slot, or may be a frequency resource randomly selected from among frequency resources with RSRPs below a specific threshold. For example, a specific threshold associated with the average RSRP and a specific threshold associated with the representative candidate frequency resource RSRP may be configured differently and separately.

In addition, for example, as a result of performing the CPS, a candidate burst occasion with the highest number of valid candidate resources (idle resources) remaining unexcluded from the candidate transmission resource selection procedure within each candidate burst occasion may be determined to be the final burst occasion.

In addition, for example, as a result of performing the CPS, one candidate burst occasion may be randomly determined to be the final burst occasion among the candidate burst occasions in which the number of valid candidate resources (idle resources) remaining unexcluded from the candidate transmission resource selection procedure within each candidate burst occasion is greater than a specific threshold.

In addition, for example, the plurality of candidate burst occasion locations may be configured to a specific configuration value, or may be determined by a UE implementation in a range greater than or equal to a specific threshold meaning a minimum value and less than or equal to a specific threshold meaning a maximum value. For example, different candidate burst occasions may be configured/determined not to overlap each other, or may be configured/determined to partially overlap. For example, a specific threshold meaning a minimum value and a specific threshold meaning a maximum value may be configured differently depending on whether a MAC PDU with a HARQ feedback is enabled (or, disabled) is transmitted, the congestion level/interference within a resource pool, QoS requirements such as reliability/latency, and/or service/packet priority.

In addition, for example, a specific threshold associated with an average RSRP of the burst occasion and a specific threshold associated with an RSRP of the representative frequency resource may be configured separately, the same, or one may be configured in association with the other.

In addition, for example, the candidate burst occasions may or may not overlap with each other.

In addition, for example, among the candidate burst occasions, a final burst occasion may be determined based on RSSI or RSRP information obtained as a result of sensing performed for the transmission of a packet other than the packet in issue.

According to one embodiment of the present disclosure, a P-UE may determine a resource selection window based on a specific configuration value or by a UE implementation, and may determine candidate resources (slots, or symbols) within the resource selection window based on a specific configuration value or by a UE implementation. And, from among the candidate resources reported to the MAC layer based on sensing, a final transmission resource may be selected at the MAC layer as follows.

For example, in order to select a number of transmission resources configured to a specific configuration value at a MAC layer, a resource may be determined sequentially among the candidate resources reported above. For example, in the process of determining the resources sequentially, when selecting the next resource after one resource has been selected, if there is a resource among the already selected resources that is temporally adjacent (contiguous) to any of the resources, that resource may be preferentially selected.

For example, in order to select a number of transmission resources configured to a specific configuration value at a MAC layer, resources may be determined sequentially among the candidate resources reported above. For example, when selecting the next resource after one resource has been selected in the above sequential resource selection process, a resource may be preferentially selected if it has a time interval within a specific threshold from any of the already selected resources.

For example, in order to select a number of transmission resources configured to a specific configuration value at a MAC layer, resources may be determined sequentially among the candidate resources reported above. For example, when selecting the next resource after one resource has been selected in the above sequential resource selection process, if any of the already selected resources falls within the time interval from the temporally first resource point to the temporally last resource point, that resource may be preferentially selected.

For example, in order to select a number of transmission resources configured to a specific configuration value at a MAC layer, resources may be determined sequentially among the candidate resources reported above. For example, when selecting the next resource after one resource has been selected in the above sequential resource selection process, if any of the already selected resources falls within a specific threshold interval from the first resource in time, that resource may be preferentially selected.

For example, in order to select a number of transmission resources configured to a specific configuration value at a MAC layer, resources may be determined sequentially among the candidate resources reported above. For example, when selecting the next resource after one resource has been selected in the above sequential resource selection process, if there is any resource whose time interval from the time of the first resource to the time of the last resource is less than or equal to a specific threshold among the resource to be selected and the resources that have already been selected, that resource may be preferentially selected.

Figure 12:
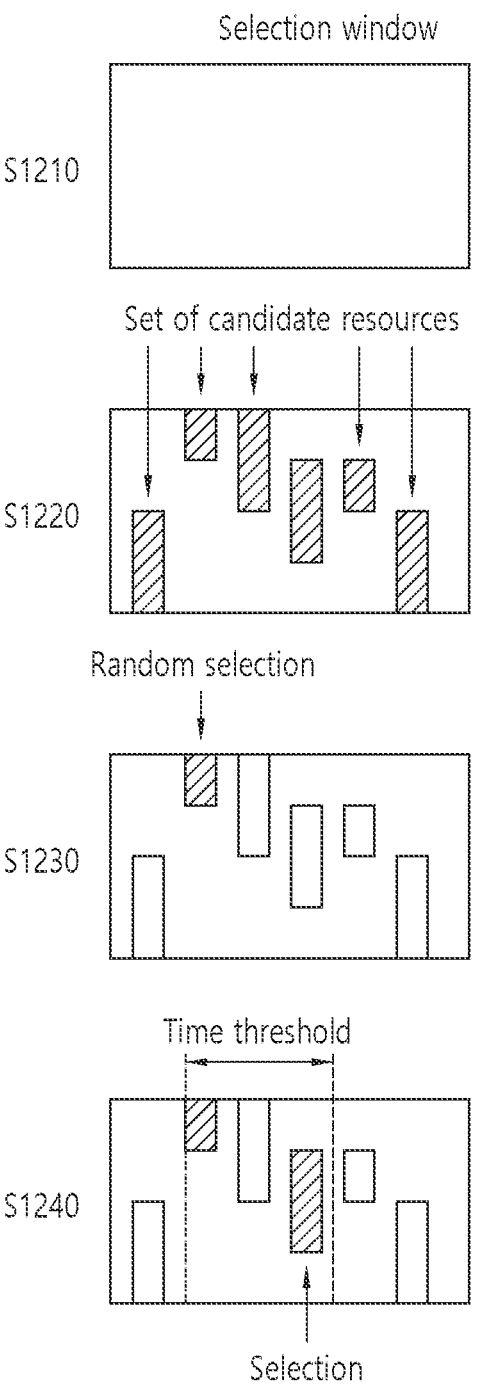
FIG. 12 shows a procedure for selecting an SL transport resource from a set of candidate resources in a selection window, according to one embodiment of the present disclosure.

FIG. 12 shows a procedure for selecting an SL transport resource from a set of candidate resources in a selection window, according to one embodiment of the present disclosure. The embodiment of FIG. 12 may be combined with various embodiments of the present disclosure.

Referring to FIG. 12, in step S1210, a UE may select a selection window for performing an SL transmission. For example, the UE may be a power saving UE. For example, the SL transmission may be a transmission that requires a plurality of SL transmission resources. Thus, the embodiment of FIG. 12 assumes a procedure for selecting a plurality of SL transmission resources, including a first SL transmission resource and a second SL transmission resource.

Step S1210 of FIG. 12 may represent a selection window selected by the UE. At step S1220, the UE may obtain a set of candidate resources of the SL transmission resource for selecting a SL transmission resource for use in performing the SL transmission within the selection window. For example, the set of candidate resources may be transferred from a physical layer of the UE to a MAC layer of the UE. For example, the set of candidate resources may be determined based on sensing performed at the physical layer.

In step S1230, the UE may randomly select a first SL transmission resource from the set of candidate resources. In step S1240, the UE may select a second SL transmission resource from the first SL transmission resource that is within a specific time threshold. That is, the operation of selecting the second SL transmission resource may be an operation of selecting a clustered (burst) transmission resource. For example, the specific time threshold may be determined according to various embodiments of the present disclosure.

For example, when the UE performs partial sensing based on an SL transmission resource selected based on the procedure of FIG. 12, intervals in which the UE operates in an active mode to perform partial sensing for the SL transmission resource may overlap with each other. Since the more overlapping the intervals of operating in active mode are, the longer the time that the UE operates in the sleep mode, the power saving effect of the UE may be improved according to the embodiment of FIG. 12.

Since the clustered (burst) transmission method can reduce the amount of time that a power-saving UE operates as an active time even if it performs partial sensing, the proposed clustered transmission method has the effect of minimizing power consumption of operations performed by a power-saving UE in an NR-V2X system supporting aperiodic transmission, according to various embodiments of the present disclosure.

Various embodiments of the present disclosure may be combined with each other.

The following describes devices to which various embodiments of the present disclosure may be applied.

Although not limited thereto, the various descriptions, features, procedures, suggestions, methods, and/or flowcharts of operation disclosed herein may be applied to various fields requiring wireless communication/connectivity (e.g., 5G) between devices.

FIG. 13 shows a procedure for a first device to perform wireless communication, according to one embodiment of the present disclosure. The embodiment of FIG. 13 may be combined with various embodiments of the present disclosure.

Referring to FIG. 13, in step S1310, a first device may determine a selection window. In step S1320, the first device may select a set of candidate resources within the selection window, based on sensing for at least one slot related to the selection window. In step S1330, the first device may randomly select a first sidelink (SL) resource among the set of candidate resources. In step S1340, the first device may select at least one SL resource within a first time threshold from the first SL resource, after selecting the first SL resource. In step S1350, the first device may transmit, to a second device, sidelink control information (SCI) for scheduling of a physical sidelink shared channel (PSSCH) through a physical sidelink control channel (PSCCH), based on the first SL resource and the at least one SL resource. In step S1360, the first device may transmit, to the second device, a medium access control (MAC) protocol data unit (PDU) through the PSSCH, based on the first SL resource and the at least one SL resource.

For example, the at least one SL resource may be included within the set of candidate resources.

For example, selecting the at least one SL resource may include: selecting a third SL resource temporally adjacent to an already selected second SL resource.

For example, selecting the at least one SL resource may include: selecting a third SL resource within a second time threshold from an already selected second SL resource.

For example, the second SL resource may be a temporally first resource among the at least one SL resource.

For example, selecting the at least one SL resource may include: selecting a second SL resource between a temporally first resource and a temporally last resource, among already selected SL resources.

For example, the first SL resource and the at least one SL resource may be selected by a medium access control (MAC) layer of the first device.

For example, a time interval between a first resource and a last resource among the set of candidate resources may be smaller than a second time threshold.

For example, the second time threshold may be determined based on at least one of whether a hybrid automatic repeat request (HARQ) feedback of the MAC PDU is enabled, congestion level within a resource pool, quality of service (QoS), or a priority.

For example, additionally, the first device may perform resource re-evaluation or pre-emption checking for the first SL resource and the at least one SL resource. For example, performing the resource re-evaluation and the pre-emption checking may include: selecting at least one candidate selection window within packet delay budget (PDB) related to the MAC PDU; performing partial sensing for a candidate resource included within the at least one candidate selection window; and selecting final selection window among the at least one candidate selection window based on the partial sensing.

For example, the sensing for the at least one slot and the partial sensing may be periodic partial sensing (PPS), and a first transmission period used in PPS performed for a candidate resource included within the at least one candidate selection window may be different from a second transmission period used in PPS performed for at least one slot related to the selection window.

For example, as PPS performed for a candidate resource included within the at least one candidate selection window, only a part of PPS performed for the at least one slot related to the selection window may be performed.

For example, additionally, the first device may obtain length of a contiguous partial sensing (CPS) window for CPS. For example, CPS related to the resource re-evaluation or the pre-emption checking may be enabled within the resource pool, the partial sensing may be CPS, and the CPS may be performed, based on the length of the CPS window, until at least one of i) a starting time point of the at least one candidate selection window, ii) before processing time of the first device from the at least one candidate selection window, iii) a candidate resource included within the at least one candidate selection window, or iv) before the processing time of the first device from a candidate resource included within the at least one candidate selection window.

The embodiments described above can be applied to various devices described below. First, a processor 102 of a first device 100 may determine a selection window. And, the processor 102 of the first device 100 may select a set of candidate resources within the selection window, based on sensing for at least one slot related to the selection window. And, the processor 102 of the first device 100 may randomly select a first sidelink (SL) resource among the set of candidate resources. And, the processor 102 of the first device 100 may select at least one SL resource within a first time threshold from the first SL resource, after selecting the first SL resource. And, the processor 102 of the first device 100 may control a transceiver 106 to transmit, to a second device 200, sidelink control information (SCI) for scheduling of a physical, sidelink shared channel (PSSCH) through a physical sidelink control channel (PSCCH), based on the first SL resource and the at least one SL resource. And, the processor 102 of the first device 100 may control the transceiver 106 to transmit, to the second device 200, a medium access control (MAC) protocol data unit (PDU) through the PSSCH, based on the first SL resource and the at least one SL resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: determine a selection window; select a set of candidate resources within the selection window, based on sensing for at least one slot related to the selection window; randomly select a first sidelink (SL) resource among the set of candidate resources; select at least one SL resource within a first time threshold from the first SL resource, after selecting the first SL resource; transmit, to a second device, sidelink control information (SCI) for scheduling of a physical sidelink shared channel (PSSCH) through a physical sidelink control channel (PSCCH), based on the first SL resource and the at least one SL resource; and transmit, to the second device, a medium access control (MAC) protocol data unit (PDU) through the PSSCH, based on the first SL resource and the at least one SL resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: determine a selection window; select a set of candidate resources within the selection window, based on sensing for at least one slot related to the selection window; randomly select a first sidelink (SL) resource among the set of candidate resources; select at least one SL resource within a first time threshold from the first SL resource, after selecting the first SL resource; transmit, to a second UE, sidelink control information (SCI) for scheduling of a physical sidelink shared channel (PSSCH) through a physical sidelink control channel (PSCCH), based on the first SL resource and the at least one SL resource; and transmit, to the second UE, a medium access control (MAC) protocol data unit (PDU) through the PSSCH, based on the first SL resource and the at least one SL resource.

According to an embodiment of the present disclosure, a non-transitory computer-readable storage medium storing instructions may be proposed. For example, the instructions, when executed, may cause a first device to: determine a selection window; select a set of candidate resources within the selection window, based on sensing for at least one slot related to the selection window; randomly select a first sidelink (SL) resource among the set of candidate resources; select at least one SL resource within a first time threshold from the first SL resource, after selecting the first SL resource; transmit, to a second device, sidelink control information (SCI) for scheduling of a physical sidelink shared channel (PSSCH) through a physical sidelink control channel (PSCCH), based on the first SL resource and the at least one SL resource; and transmit, to the second device, a medium access control (MAC) protocol data unit (PDU) through the PSSCH, based on the first SL resource and the at least one SL resource.

FIG. 14 shows a procedure for a second device to perform wireless communication, according to one embodiment of the present disclosure. The embodiment of FIG. 14 may be combined with various embodiments of the present disclosure.

Referring to FIG. 14, in step S1410, a second device may receive, from a first device, sidelink control information (SCI) for scheduling of a physical sidelink shared channel (PSSCH) through a physical sidelink control channel (PSCCH), based on a first SL resource and at least one SL resource. In step S1420, the second device may receive, from the first device, a medium access control (MAC) protocol data unit (PDU) through the PSSCH, based on the first SL resource and the at least one SL resource. For example, the first SL resource may be randomly selected among a set of candidate resources, the at least one SL resource may be selected among resources within a first time threshold from the first SL resource, after the first SL resource is selected, and the set of candidate resources may be selected within a selection window, based on sensing for at least one slot related to the selection window.

For example, the at least one SL resource may be included within the set of candidate resources.

The embodiments described above can be applied to various devices described below. First, a processor 202 of a second device 200 may control a transceiver 206 to receive, from a first device 100, sidelink control information (SCI) for scheduling of a physical sidelink shared channel (PSSCH) through a physical sidelink control channel (PSCCH), based on a first SL resource and at least one SL resource. Second, the processor 202 of the second device 200 may control the transceiver 206 to receive, from the first device 100, a medium access control (MAC) protocol data unit (PDU) through the PSSCH, based on the first SL resource and the at least one SL resource. For example, the first SL resource may be randomly selected among a set of candidate resources, the at least one SL resource may be selected among resources within a first time threshold from the first SL resource, after the first SL resource is selected, and the set of candidate resources may be selected within a selection window, based on sensing for at least one slot related to the selection window.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: receive, from a first device, sidelink control information (SCI) for scheduling of a physical sidelink shared channel (PSSCH) through a physical sidelink control channel (PSCCH), based on a first SL resource and at least one SL resource; and receive, from the first device, a medium access control (MAC) protocol data unit (PDU) through the PSSCH, based on the first SL resource and the at least one SL resource, wherein the first SL resource may be randomly selected among a set of candidate resources, wherein the at least one SL resource may be selected among resources within a first time threshold from the first SL resource, after the first SL resource is selected, and wherein the set of candidate resources may be selected within a selection window, based on sensing for at least one slot related to the selection window.

For example, the at least one SL resource may be included within the set of candidate resources.

Hereinafter, a description will be given in more detail with reference to the drawings. In the following drawings/description, the same reference symbols may denote the same or corresponding hardware blocks, software blocks, or functional blocks unless described otherwise.

Figure 15:
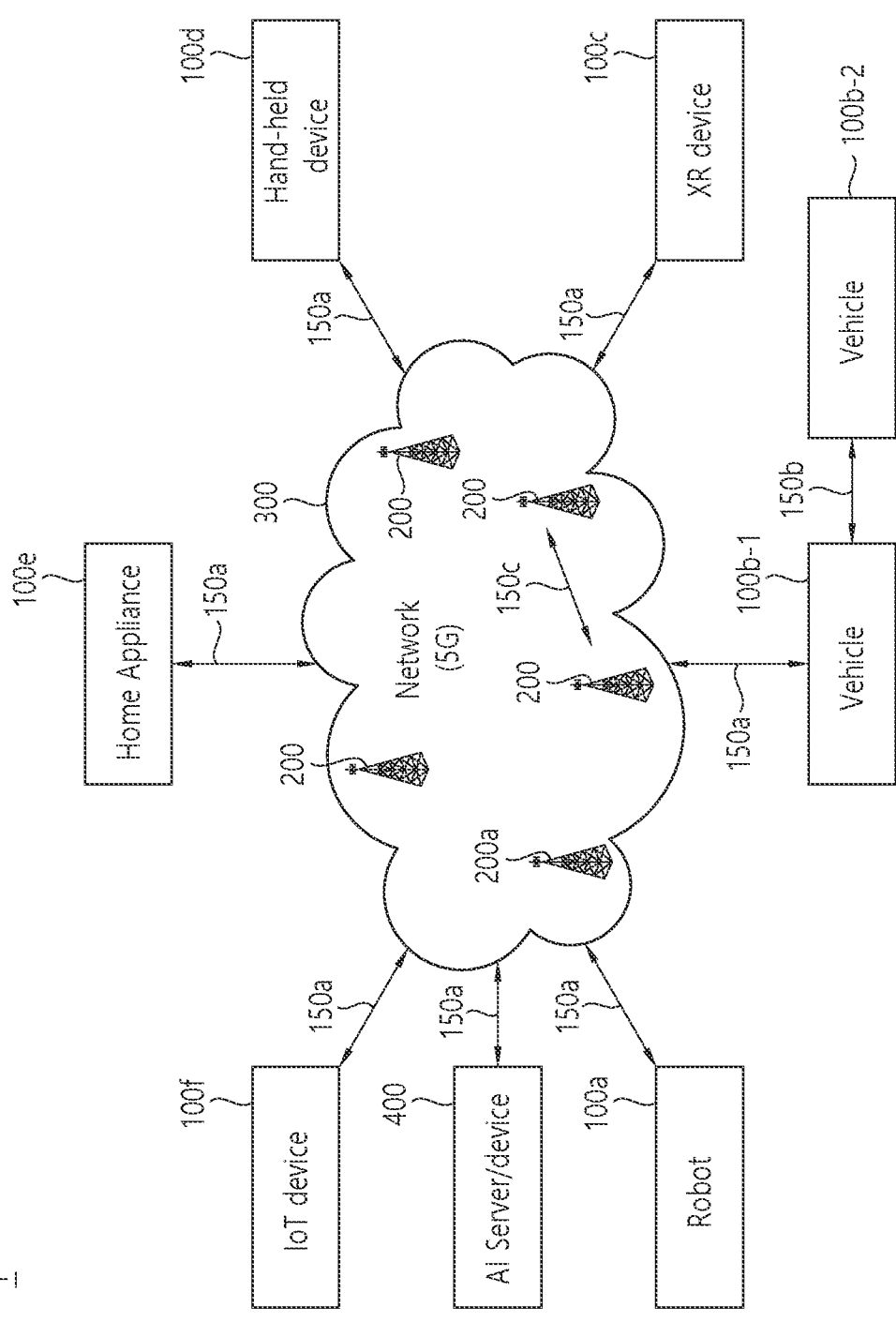
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100 f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100 f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100 f may be connected to the network 300 via the BSs 200. An AI technology may be applied to the wireless devices 100a to 100 f and the wireless devices 100a to 100 f may be connected to the AI server 400 via the network 300. The network 300 may be configured using a 3G network, a 4G (e.g., LTE) network, or a 5G (e.g., NR) network. Although the wireless devices 100a to 100 f may communicate with each other through the BSs 200/ network 300, the wireless devices 100a to 100 f may perform direct communication (e.g., sidelink communication) with each other without passing through the BSs/ network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100 f.

Wireless communication/connections 150a, 150b, or 150c may be established between the wireless devices 100a to 100 f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
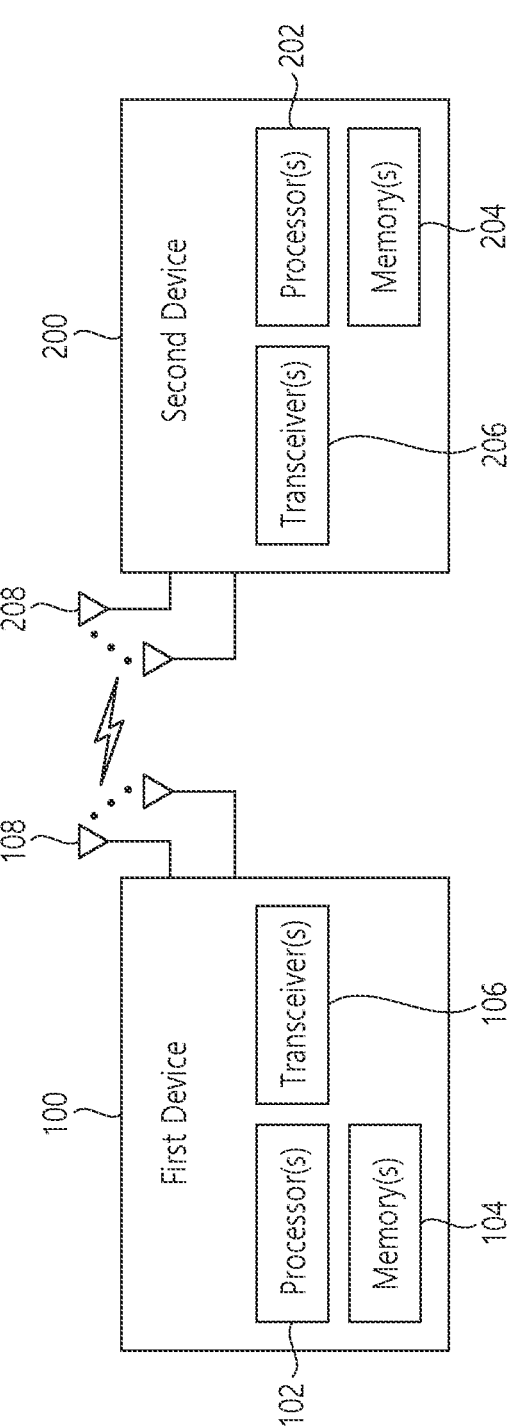
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
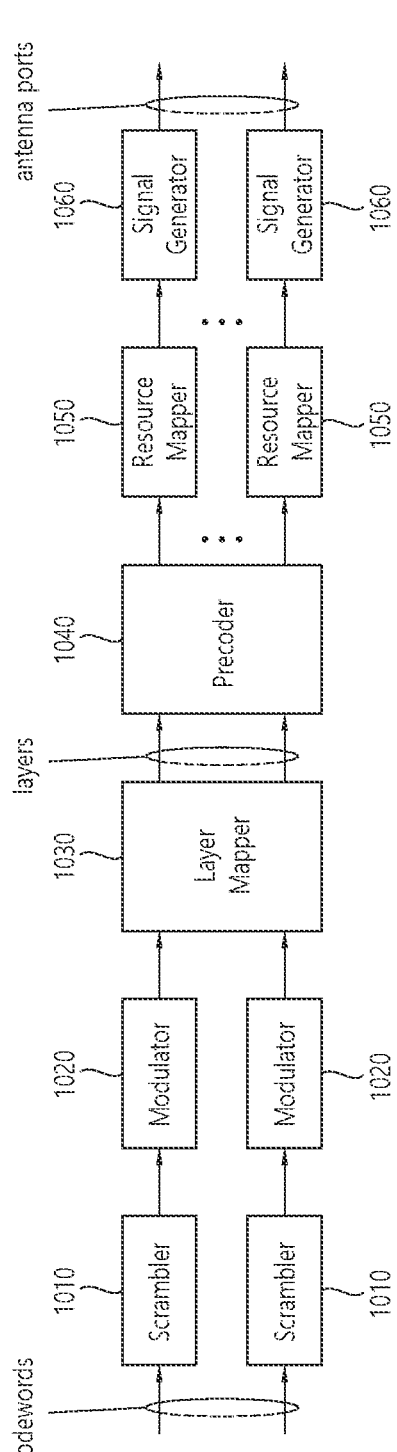
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
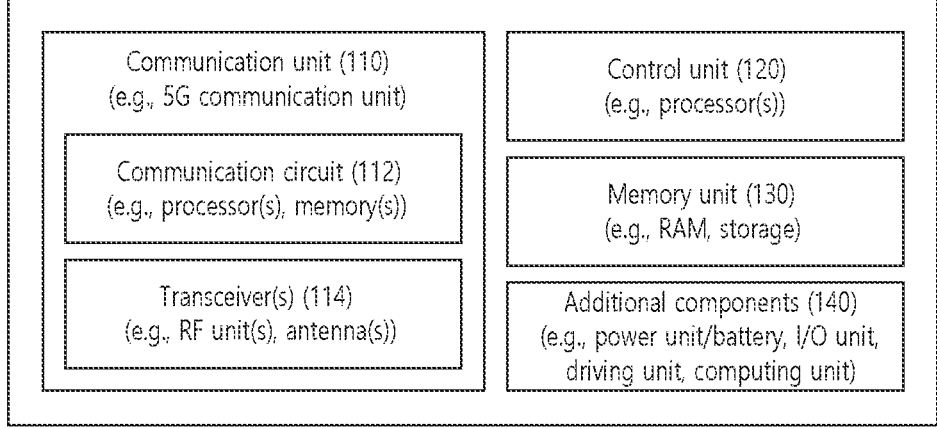
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
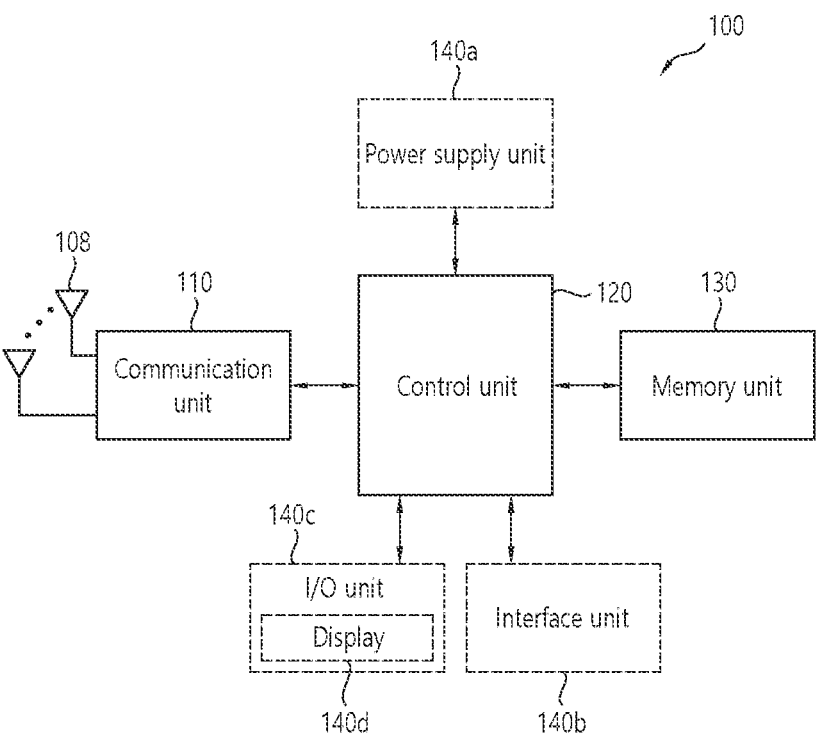
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include lan antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
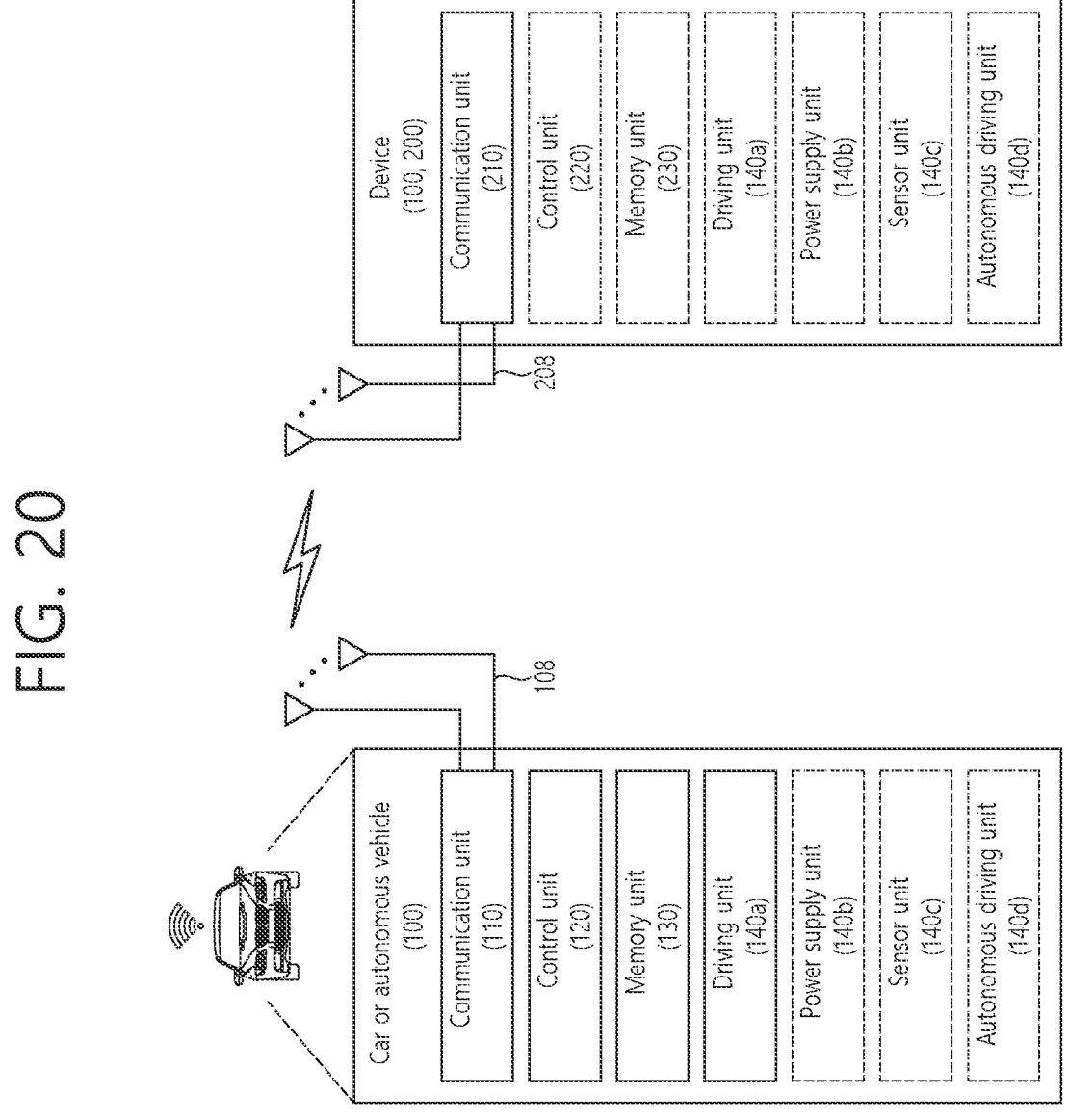
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
determining a selection window;
determining a set of candidate resources within the selection window, based on sensing for at least one slot related to the selection window;
randomly selecting a first sidelink (SL) resource among the set of candidate resources;
selecting at least one SL resource consisting of an aggregated resource that includes the first SL resource, within a first time threshold from the first SL resource, after selecting the first SL resource;
transmitting, to a second device, sidelink control information (SCI) for scheduling of a physical sidelink shared channel (PSSCH) through a physical sidelink control channel (PSCCH), based on the first SL resource and the at least one SL resource; and
transmitting, to the second device, a medium access control (MAC) protocol data unit (PDU) through the PSSCH, based on the first SL resource and the at least one SL resource.

2. The method of claim 1, wherein the at least one SL resource is included within the set of candidate resources.

3. The method of claim 2, wherein selecting the at least one SL resource includes:
selecting a third SL resource temporally adjacent to an already selected second SL resource.

4. The method of claim 2, wherein selecting the at least one SL resource includes:
selecting a third SL resource within a second time threshold from an already selected second SL resource.

5. The method of claim 4, wherein the second SL resource is a temporally first resource among the at least one SL resource.

6. The method of claim 2, wherein selecting the at least one SL resource includes:
selecting a second SL resource between a temporally first resource and a temporally last resource, among already selected SL resources.

7. The method of claim 1, wherein the first SL resource and the at least one SL resource are selected by a medium access control (MAC) layer of a first device.

8. The method of claim 1, wherein a time interval between a first resource and a last resource among the set of candidate resources is smaller than a second time threshold.

9. The method of claim 8, wherein the second time threshold is determined based on at least one of whether a hybrid automatic repeat request (HARQ) feedback of the MAC PDU is enabled, congestion level within a resource pool, quality of service (QoS), or a priority.

10. The method of claim 1, further comprising:
performing resource re-evaluation or pre-emption checking for the first SL resource and the at least one SL resource,
wherein performing the resource re-evaluation and the pre-emption checking includes:
selecting at least one candidate selection window within packet delay budget (PDB) related to the MAC PDU;
performing partial sensing for a candidate resource included within the at least one candidate selection window; and
selecting final selection window among the at least one candidate selection window based on the partial sensing.

11. The method of claim 10, wherein the sensing for the at least one slot and the partial sensing is periodic partial sensing (PPS), and
wherein a first transmission period used in PPS performed for a candidate resource included within the at least one candidate selection window is different from a second transmission period used in PPS performed for at least one slot related to the selection window.

12. The method of claim 11, wherein as PPS performed for a candidate resource included within the at least one candidate selection window, only a part of PPS performed for the at least one slot related to the selection window is performed.

13. The method of claim 10, further comprising:
obtaining length of a contiguous partial sensing (CPS) window for CPS,

wherein CPS related to the resource re-evaluation or the pre-emption checking is enabled within the resource pool, wherein the partial sensing is CPS, and wherein the CPS is performed, based on the length of the CPS window, until at least one of i) a starting time point of the at least one candidate selection window, ii) before processing time of a first device from the at least one candidate selection window, iii) a candidate resource included within the at least one candidate selection window, or iv) before the processing time of the first device from a candidate resource included within the at least one candidate selection window.

14. A first device comprising:

one or more processors;

one or more transceivers; and one or more memories connected to the one or more processors and storing instructions, wherein the instructions, based on being executed by the one or more processors, cause the first device to:

determine a selection window;

select a set of candidate resources within the selection window, based on sensing for at least one slot related to the selection window;

randomly select a first sidelink (SL) resource among the set of candidate resources;

select at least one SL resource consisting of an aggregated resource that includes the first SL resource, within a first time threshold from the first SL resource, after selecting the first SL resource;

transmit, to a second device, sidelink control information (SCI) for scheduling of a physical sidelink shared channel (PSSCH) through a physical sidelink control channel (PSCCH), based on the first SL resource and the at least one SL resource; and transmit, to the second device, a medium access control (MAC) protocol data unit (PDU) through the PSSCH, based on the first SL resource and the at least one SL resource.

15. A processing device adapted to control a first device, the processing device comprising:

one or more processors; and one or more memories connected to the one or more processors and storing instructions, wherein the instructions, based on being executed by the one or more processors, cause the first device to:

determine a selection window;

select a set of candidate resources within the selection window, based on sensing for at least one slot related to the selection window;

randomly select a first sidelink (SL) resource among the set of candidate resources;

select at least one SL resource consisting of an aggregated resource that includes the first SL resource, within a first time threshold from the first SL resource, after selecting the first SL resource;

transmit, to a second device, sidelink control information (SCI) for scheduling of a physical sidelink shared channel (PSSCH) through a physical sidelink control channel (PSCCH), based on the first SL resource and the at least one SL resource; and transmit, to the second device, a medium access control (MAC) protocol data unit (PDU) through the PSSCH, based on the first SL resource and the at least one SL resource.

* * * * *